United States Patent
Wood et al.

(10) Patent No.: US 9,514,213 B2
(45) Date of Patent: Dec. 6, 2016

(54) PER-ATTRIBUTE DATA CLUSTERING USING TRI-POINT DATA ARBITRATION

(71) Applicant: ORACLE INTERNATIONAL CORPORATION, Redwood Shores, CA (US)

(72) Inventors: Alan Paul Wood, San Jose, CA (US); Aleksey M. Urmanov, San Diego, CA (US); Anton A. Bougaev, San Diego, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 273 days.

(21) Appl. No.: 13/833,757

(22) Filed: Mar. 15, 2013

(65) Prior Publication Data

US 2014/0280146 A1    Sep. 18, 2014

(51) Int. Cl.
*G06F 7/00*    (2006.01)
*G06F 17/30*    (2006.01)

(52) U.S. Cl.
CPC ............................... *G06F 17/30598* (2013.01)

(58) Field of Classification Search
None
See application file for complete search history.

(56) References Cited

U.S. PATENT DOCUMENTS

| | | | |
|---|---|---|---|
| 5,040,133 A * | 8/1991 | Feintuch et al. ............... | 702/180 |
| 5,987,399 A | 11/1999 | Wegerich et al. | |
| 6,049,797 A * | 4/2000 | Guha et al. | |
| 6,092,072 A * | 7/2000 | Guha ................ | G06F 17/30598 707/700 |
| 6,882,998 B1 * | 4/2005 | Stemp .......................... | 707/737 |
| 2002/0099675 A1 * | 7/2002 | Agrafiotis et al. .............. | 706/15 |
| 2010/0067745 A1 * | 3/2010 | Kovtun et al. ................ | 382/106 |
| 2011/0105885 A1 * | 5/2011 | Liew et al. ................... | 600/410 |
| 2012/0054184 A1 * | 3/2012 | Masud et al. ................. | 707/737 |
| 2012/0173547 A1 * | 7/2012 | Suntinger et al. ............ | 707/749 |
| 2014/0006403 A1 * | 1/2014 | King et al. ................... | 707/737 |

OTHER PUBLICATIONS

Han et al., Data Mining: Concepts and Techniques; University of Illinois at Urbana-Champaign, 2006, Morgan Kaufmann Publishers, pp. 1-28, San Francisco, CA.

J. MacQueen; Some Methods for Classification and Analysis of Multivariate Observations; University of California, Los Angeles, Proceedings of Fifth Berkeley Symposium on Mathematical Statistics and Probability, 1967 pp. 281-297, University of California, Los Angeles, CA.

(Continued)

*Primary Examiner* — Jason Liao
*Assistant Examiner* — David T Brooks
(74) *Attorney, Agent, or Firm* — Kraguljac Law Group, LLC

(57) ABSTRACT

Systems, methods, and other embodiments associated with clustering using tri-point arbitration are described. In one embodiment, a method includes selecting a data point pair and a set of arbiter points. A tri-point arbitration similarity is calculated for data point pairs based, at least in part, on a distance between the first and second data points and the arbiter points. In one embodiment, similar data points are clustered.

41 Claims, 11 Drawing Sheets

$$\rho TAC(x_1,x_2|a) = \frac{\min\{\rho(x_1,a), \rho(x_2,a)\} - \rho(x_1, x_2)}{\max\{\rho(x_1, x_2), \min\{\rho(x_1,a), \rho(x_2,a)\}\}}$$

(56) References Cited

OTHER PUBLICATIONS

Stephen C. Johnson; Hierarchical Clustering Schemes; Psychometrika—vol. 32, No. 3, Sep. 1967, pp. 241-254; Bell Telephone Laboratories, Murray Hill, NJ.
Ester et al.; A Density-Based Algorithm for Discovering Clusters in Large Spatial Databases with Noise; in Proc. 2nd Int'l. Conf. Knowledge Discovery and Data Mining, 1996, pp. 226-231; AAAI Press, Menlo Park, CA.
Banfield et al.; Model-Based Gaussian and Non-Gaussian Clustering; Biometrics, vol. 49, No. 3; Sep. 1993; pp. 803-821; International Biometric Society.
Teuvo Kohonen; Self-Organized Formation of Topologically Correct Feature Maps; Biological Cybernetics 43, 1982; pp. 59-69; Dept. of Technical Physics, Hensinki University of Technology, Espoo, Finland.
Michael W. Trosset; Representing Clusters: K-Means Clustering, Self-Organizing Maps, and Multidimensional Scaling; Apr. 6, 2006; pp. 1-17; Dept. of Mathematics, College of William & Mary, Williamsburg, VA.
Wikipedia; Iris Flower Data Set; downloaded May 17, 2013 from: http://en.wikipedia.org/wiki/Iris_flower_data_set; pp. 1-11.

* cited by examiner

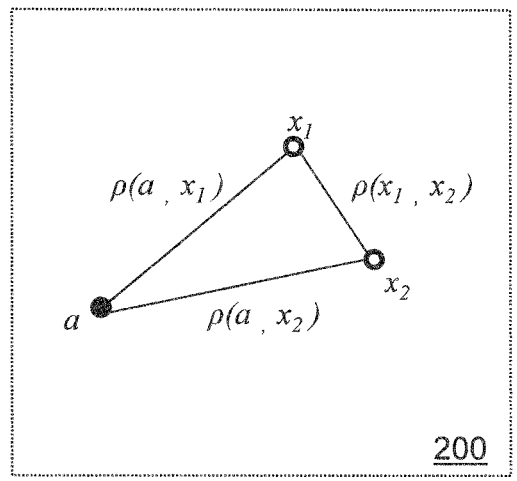
$$\rho TAC(x_1, x_2 | a) = \frac{\min\{\rho(x_1,a), \rho(x_2,a)\} - \rho(x_1, x_2)}{\max\{\rho(x_1, x_2), \min\{\rho(x_1,a), \rho(x_2,a)\}\}}$$
210
Figure 2

1000

| Patient | Age at initial pathologic diagnosis | Gender | Karnofsky performance score | Endothelial proliferation | Palisading necrosis | Percent necrosis | Percent tumor cells | Days to Death |
|---|---|---|---|---|---|---|---|---|
| 1 | 54 | FEMALE | 80 | YES | YES | 20 | 80 | 556 |
| 2 | null | MALE | 60 | YES | NO | 10 | 90 | 208 |
| 3 | null | MALE | 80 | YES | YES | 5 | 75 | 447 |
| 4 | null | MALE | null | YES | NO | 10 | 90 | 97 |
| 5 | null | MALE | 100 | NO | YES | 20 | 80 | 458 |
| 6 | 49 | MALE | 80 | YES | YES | 10 | 90 | 383 |
| 7 | 44 | FEMALE | 80 | NO | NO | 0 | 100 | 199 |
| 8 | 62 | FEMALE | 80 | NO | NO | 20 | 60 | 76 |
| 9 | 66 | FEMALE | 80 | YES | YES | 20 | 80 | 604 |
| 10 | 28 | FEMALE | 80 | NO | NO | 0 | 100 | 254 |

1050

| Patient | Age at initial diagnosis | Gender | Performance score | Attribute4 | Attribute5 | Attribute6 | Attribute7 | Outcome |
|---|---|---|---|---|---|---|---|---|
| 1 | 54 | FEMALE | 80 | YES | YES | 20 | 80 | 556 |
| 2 | null | MALE | 60 | YES | NO | 10 | 90 | 208 |
| 3 | null | MALE | 80 | YES | YES | 5 | 75 | 447 |
| 4 | null | MALE | null | YES | NO | 10 | 90 | 97 |
| 5 | null | MALE | 100 | NO | YES | 20 | 80 | 458 |
| 6 | 49 | MALE | 80 | YES | YES | 10 | 90 | 383 |
| 7 | 44 | FEMALE | 80 | NO | NO | 0 | 100 | 199 |
| 8 | 62 | FEMALE | 80 | NO | NO | 20 | 60 | 76 |
| 9 | 66 | FEMALE | 80 | YES | YES | 20 | 80 | 604 |
| 10 | 28 | FEMALE | 80 | NO | NO | 0 | 100 | 254 |

Figure 10

PER-ATTRIBUTE DATA CLUSTERING USING TRI-POINT DATA ARBITRATION

BACKGROUND

Clustering or data grouping is one of the fundamental data processing activities. Clustering seeks to uncover otherwise hidden relationships between data objects with the goal of using the relationships to predict outcomes based on new data objects. For example, by identifying clusters in a set of patient data, an analyst can identify subgroups of patients with different success rates to specific treatments based on patients' data. The treatment plan for a new patient can then be based on the relationship between the new patient's data and the data for patients in the various subgroups, thus maximizing the success probability for the selected treatment regimen.

Clustering, as a data analysis tool, creates groups of data that are "close" together, where "close" implies a distance metric. Distance calculations used in clustering are defined by an analyst for the type of data based on the analyst's subjective intuition and/or experience about the similarity of the data. In some clustering techniques, the analyst selects a number of clusters to be created. Thus, the analyst's bias is present in some form in the resulting clustering, which may be overfit to existing data and produce arbitrarily uncertain results on new data.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be designed as multiple elements or that multiple elements may be designed as one element. In some embodiments, an element shown as an internal component of another element may be implemented as an external component and vice versa. Furthermore, elements may not be drawn to scale.

FIG. 2 illustrates an embodiment of a method associated with similarity analysis with tri-point data arbitration.

FIG. 10 illustrates results of one embodiment of data clustering using tri-point data arbitration given an example set of data points.

DETAILED DESCRIPTION

Figure 1:
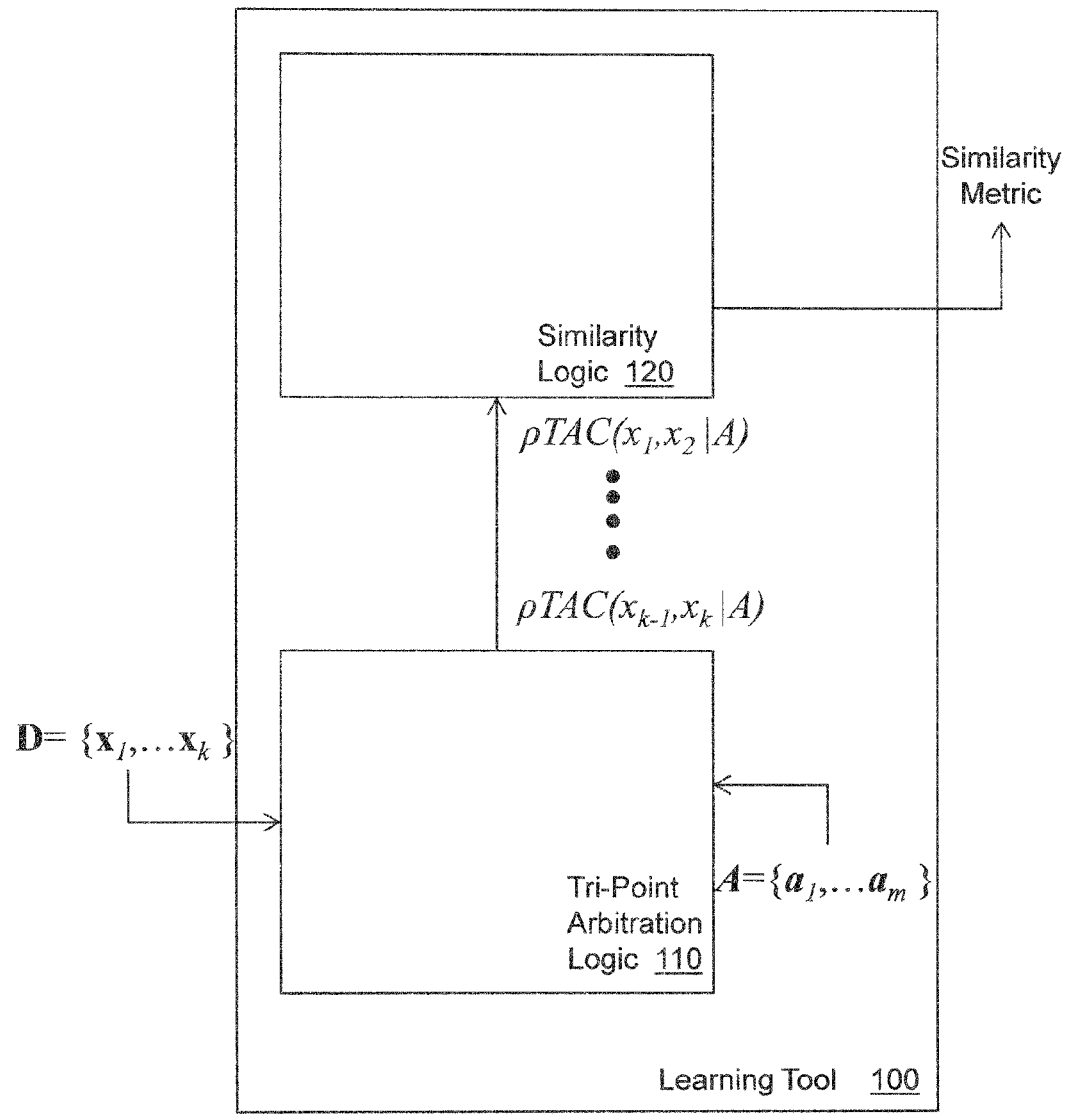
FIG. 1 illustrates an embodiment of a system associated with similarity analysis with tri-point data arbitration.

Data clustering systems and methods described herein are based upon a similarity metric determined by way of tri-point arbitration. Tri-point arbitration removes the analyst bias from the similarity analysis by substituting, as arbiter of similarity (e.g., distance), other data points in a data set. The use of tri-point arbitration to produce a similarity metric between data points is described herein with reference to FIGS. 1-6. Data clustering using the similarity metric as determined by tri-point arbitration is described herein with reference to FIGS. 7-11.

Similarity Analysis with Tri-Point Arbitration

The basic building block of traditional similarity analysis in machine learning and data mining is categorizing data and their attributes into known and well-defined domains and identifying appropriate relations for handling the data and their attributes. For example, similarity analysis includes specifying equivalence, similarity, partial order relations, and so on. In trivial cases when all attributes are numeric and represented by real numbers, comparing data point attributes is done by using the standard less-than, less-than-or-equal, more-than, and more-than-or-equal relations, and comparing points by computing distances (e.g., Euclidean) between the two points. In this case, the distance between two data points serves as the measure of similarity between the data points. If the distance is small, the points are deemed similar. If the distance is large, the points are deemed dissimilar.

A matrix of pair-wise distances between all data points in a data set is a standard similarity metric that is input to a variety of data mining and machine learning tools for clustering, classification, pattern recognition, and information retrieval. Euclidean distance is one possible distance between data points for use in the pair-wise matrix. A variety of other distance-based measures may be used depending on the specific domain of the data set. However, the distance based measures used in traditional machine learning are understandably all based on two data points.

One of the deficiencies of the traditional two data point distance approach to similarity analysis is the subjectivity that is introduced into the analysis by an outside analyst. An outside analyst determines the threshold on distances that indicate similarity. This leads to non-unique outcomes which depend on the analyst's subjectivity in threshold selection.

Traditionally, a determination as to what constitutes "similarity" between data points in a data set is made by an analyst outside the data set. For example, a doctor searching for patients in a data set having "similar" age to a given patient specifies an age range in her query that, in her opinion, will retrieve patients with a similar age. However, the age range that actually represents "similar" ages depends upon the data set itself. If the data set contains patients that are all very similar in age to the given patient, the query may be over-selective, returning too many patients to effectively analyze. If the data set contains patients that have ages that have a wide variety of ages, the query may be under-selective, missing the most similar patients in the data set.

Another deficiency in the traditional two point distance approach to similarity analysis is the conceptual difficulty of combining attributes of different types into an overall similarity of objects. The patient age example refers to a data point with a single, numerical, attribute. Most machine learning is performed on data points that have hundreds of attributes, with possibly non-numerical values. Note that the analyst will introduce their own bias in each dimension, possibly missing data points that are actually similar to a target data point. Some pairs of points may be close in distance for a subset of attributes of one type and far apart in distance for another subset of attribute types. Thus, the analyst may miss data points that are similar to the target data point for reasons that are as yet unappreciated by the analyst. Proper selection of the similarity metric is fundamental to the performance of clustering, classification and pattern recognition methods used to make inferences about a data set.

Systems and methods are described herein that cluster based on similarity analysis based on tri-point arbitration. Rather than determining similarity by an external analyst, tri-point arbitration determines similarity with an internal arbiter that is representative of the data set itself. Thus, rather than expressing similarity based on distances between two points and forcing the analyst to determine a range of distances that is similar, the systems and methods herein use three points to determine similarity, thereby replacing the external analyst with an internal arbiter point that represents the data set, i.e., introducing an internal analyst into similarity determination.

Tri-point arbitration is realized through the introduction of an arbiter data point into the process of evaluation of two or more data points for processing attributes and attribute combinations allowing for inference about possible relationships between the data points. The term "data point" is used in the most generic sense and can represent points in a multidimensional metric space, images, sound and video streams, free texts, genome sequences, collections of structured or unstructured data of various types. The disclosed tri-point arbitration techniques uncover the intrinsic structure in a group of data points, facilitating inferences about the interrelationships among data points in a given data set or population. The disclosed tri-point arbitration techniques have extensive application in the fields of data mining, machine learning, and related fields that in the past have relied on two point distance based similarity metrics.

With reference to FIG. 1, one embodiment of a learning tool 100 that performs similarity analysis using tri-point arbitration is illustrated. The learning tool 100 inputs a data set D of data points $\{x_1, \ldots, x_k\}$ and calculates a similarity metric using tri-point arbitration. The learning tool 100 includes a tri-point arbitration logic 110 and a similarity logic 120. The tri-point arbitration logic 110 selects a data point pair $(x_1, x_2)$ from the data set. The tri-point arbitration logic 110 also selects an arbiter point $(a_1)$ from a set of arbiter points, A, that is representative of the data set. Various examples of sets of arbiter points will be described in more detail below.

The tri-point arbitration logic 110 calculates a tri-point arbitration coefficient for the data point pair based, at least in part, on a distance between the first and second data points and the selected arbiter point $a_1$. The tri-point arbitration logic 110 calculates additional respective tri-point arbitration coefficients for the data point pair $(x_1, x_2)$ based on respective arbiter points $(a_2\text{-}a_n)$. The tri-point arbitration coefficients for the data pair are combined in a selected manner to create an aggregate tri-point arbitration coefficient for the data pair. The aggregate tri-point arbitration coefficient for the data point pair, denoted $\rho TAC(x_1, x_2|A)$, is provided to the similarity logic 120. The tri-point arbitration logic 110 computes aggregate tri-point arbitration coefficients for the other data point pairs in the data set and also provides those tri-point arbitration coefficients to the similarity logic 120.

FIG. 2 illustrates one embodiment of a tri-point arbitration technique that may be used by the tri-point arbitration logic 110 to compute the tri-point arbitration coefficient. A plot 200 illustrates a spatial relationship between the data points in the data point pair $(x_1, x_2)$ and an arbiter point a. Recall that the data points and arbiter point will typically have many more dimensions than the two shown in the simple example plot 200. The data points and arbiter points may be points or sets in multi-dimensional metric spaces, time series, or other collections of temporal nature, free text descriptions, and various transformations of these. A tri-point arbitration coefficient for data points $(x_1, x_2)$ with respect to arbiter point a is calculated as shown in 210, where $\rho$ designates a two-point distance determined according to any appropriate technique:

$$\rho TAC(x_1, x_2 \mid a) = \frac{\min\{\rho(x_1, a), \rho(x_2, a)\} - \rho(x_1, x_2)}{\max\{\rho(x_1, x_2), \min\{\rho(x_1, a), \rho(x_2, a)\}\}}$$

Thus, the tri-point arbitration technique illustrated in FIG. 2 calculates the tri-point arbitration coefficient based on a first distance between the first and second data points, a second distance between the arbiter point and the first data point, and a third distance between the arbiter point and the second data point.

Values for the tri-point arbitration coefficient for a single arbiter point, $\rho TAC(x_1, x_2|a)$, range from $-1$ to $1$. In terms of similarities, $\rho TAC(x_1, x_2)|a)>0$ when both distances from the arbiter to either data point are greater than the distance between the data points. In this situation, the data points are closer to each other than to the arbiter. Thus a positive tri-point arbitration coefficient indicates similarity, and the magnitude of the positive coefficient indicates a level of similarity. $\rho TAC(x_1, x_2|a)=+1$ indicates a highest level of similarity, where the two data points are coincident with one another.

In terms of dissimilarity, $\rho TAC(x_1, x_2|a)<0$ results when the distance between the arbiter and one of the data points is more than the distance between the data points. In this situation, the arbiter is closer to one of the data points than the data points are to each other. Thus a negative tri-point arbitration coefficient indicates dissimilarity, and the magnitude of the negative coefficient indicates a level of dissimilarity. $\rho TAC(x_1, x_2|a)=-1$ indicates a complete dissimilarity between the data points, when the arbiter coincides with one of the data points.

A tri-point arbitration coefficient equal to zero results when the arbiter and data points are equidistant from one another. Thus $\rho TAC(x_1, x_2|a)=0$ designates complete indifference with respect to the arbiter point, meaning that the arbiter point cannot determine whether the points in the data point pair are similar or dissimilar. If both data points and the arbiter are coincident, $\rho TAC(x_1, x_2|a)=0$.

Returning to FIG. 1, the similarity logic 120 determines a similarity metric for the data set based, at least in part, on the aggregate tri-point arbitration coefficients for the data point pairs. In one embodiment, the similarity metric is a pair-wise matrix, $M_{TAC}$, of tri-point arbitration coefficients using the empirical formulation:

$$M_{TAC} = \begin{matrix} \rho ETAC(x_1, x_1 \mid A) & \ldots & \rho ETAC(x_1, x_k \mid A) \\ \rho ETAC(x_2, x_1 \mid A) & \ldots & \rho ETAC(x_2, x_k \mid A) \\ \ldots & & \ldots \\ \rho ETAC(x_k, x_1 \mid A) & \ldots & \rho ETAC(x_k, x_k \mid A) \end{matrix}$$

The illustrated pair-wise $M_{TAC}$ matrix arranges the aggregate tri-point arbitration coefficient for the data points in rows and columns where rows have a common first data point and columns have a common second data point. When searching for data points that are similar to a target data point within the data set, either the row or column for the target data point will contain tri-point arbitration coefficients for the other data points with respect to the target data point. High positive coefficients in either the target data point's row or column may be identified to determine the most similar data points to the target data point. Further, the pair-wise $M_{TAC}$ matrix can be used for any number of learning applications, including clustering and classification based on the traditional matrix of pair-wise distances. The matrix may also be used as the proxy for similarity/dissimilarity of the pairs.

As already discussed above, the arbitration point(s) represent the data set rather than an external analyst. There are several ways in which a set of arbitration points may be selected that represents the data set. The set of arbitration points A may represent the data set based on an empirical observation of the data set. For example, the set of arbitration points may include all points in the data set. The set of arbitration points may include selected data points that are weighted when combined to reflect a contribution of the data point to the overall data set. The aggregate tri-point arbitration coefficient calculated based on a set of arbitration points that are an empirical representation of the data set (denoted $\rho ETAC(x_1, x_2 \mid A)$) may be calculated as follows:

$$\rho ETAC(x_1, x_2 \mid A) = \Sigma_{i=1}^m w_i \rho TAC(x_1, x_2 \mid a_i)$$

where $\Sigma_{i=1}^m w_i = 1$

Setting $w_i = 1/m$ for all i in the above equation calculates the average.

Variations of aggregation of arbitration points including various weighting schemes may be used. Other examples of aggregation may include majority/minority voting, computing median, and so on.

For a known or estimated probability distribution of data points in the data set, the set of arbitration points corresponds to the probability distribution, f(a). The aggregate tri-point arbitration coefficient calculated based on the probability distribution (denoted $\rho PTAC$) may be calculated as follows:

$$\rho PTAC(x_1, x_2 \mid f(a)) = \int_{a_{lo}}^{a_{hi}} \rho TAC(x_1, x_2 \mid a) f(a) \, da$$

As an illustration, the $\rho PTAC$ for a uniformly distribution of data points in intervals computed analytically in closed form are given by the following equations assuming the Euclidean distance.

For $a_1 \leq x_1 - (x_2-x_1) \leq x \leq x_2 \leq x_2 + (x_2-x_1) \leq a_2$, the $\rho PTAC$ is given by:

$$\rho PTAC(x_1, x_2 \mid f(a)) = \frac{x_1 - (x_2 - x_1) - a_1}{a_2 - a_1} +$$

$$\frac{x_2 - x_1}{a_2 - a_1}(\log(x_2 - x_1) - \log(x_1 - a_1)) +$$

$$\frac{5}{8}\frac{x_2 - x_1}{a_2 - a_1} -$$

$$\frac{3}{2}\frac{x_2 - x_1}{a_1 - a_1} +$$

$$\frac{5}{8}\frac{x_2 - x_1}{a_2 - a_1} -$$

$$\frac{3}{2}\frac{x_2 - x_1}{a_2 - a_1} +$$

$$\frac{a_2 - (x_2 + (x_2 - x_1))}{a_2 - a_1} -$$

$$\frac{x_2 - x_1}{a_2 - a_1}(\log(a_2 - x_2) - \log(x_2 - x_1))$$

For $x_1 - (x_2-x_1) \leq a_1$ and $x_2 + (x_2-x_1) \leq a_2$, the $\rho PTAC$ is:

$$\rho PTAC(x_1, x_2 \mid f(a)) = \frac{(x_1 - a_1)^2}{2(x_2 - x_1)(a_2 - a_1)} + \frac{x_2 - x_1}{8(a_2 - a_1)} -$$

$$\frac{x_1 + (x_2 - x_1)/2 - a_1}{a_2 - a_1} +$$

$$\frac{5}{8}\frac{x_2 - x_1}{a_2 - a_1} -$$

$$\frac{3}{2}\frac{x_2 - x_1}{a_2 - a_1} +$$

$$\frac{a_2 - (x_2 + (x_2 - x_1))}{a_2 - a_1} -$$

$$\frac{x_2 - x_1}{a_2 - a_1}(\log(a_2 - x_2) - \log(x_2 - x_1))$$

And for $x_1 - (x_2-x_1) \geq a_1$ and $x_2 + (x_2-x_1) \geq a_2$, the PTAC is:

$$\rho PTAC(x_1, x_2 \mid f(a)) = \frac{x_1 - (x_2 - x_1) - a_1}{a_2 - a_1} +$$

$$\frac{x_2 - x_1}{a_2 - a_1}(\log(x_2 - x_1) - \log(x_1 - a_1)) +$$

$$\frac{5}{8}\frac{x_2 - x_1}{a_2 - a_1} -$$

$$\frac{3}{2}\frac{x_2 - x_1}{a_2 - a_1} +$$

$$\frac{x_2 - x_1}{8(a_2 - a_1)} + \frac{(a_2 - x_2)^2}{2(x_2 - x_1)(a_2 - a_1)} -$$

$$\frac{a_2 - (x_2 - (x_2 - x_1)/2)}{a_2 - a_1}$$

Thus, the tri-point arbitration coefficient can be calculated using an empirical observation of the data point values in the data set, an estimated distribution of the data point values in the data set or an actual distribution of data point values in the data set.

Figure 3:
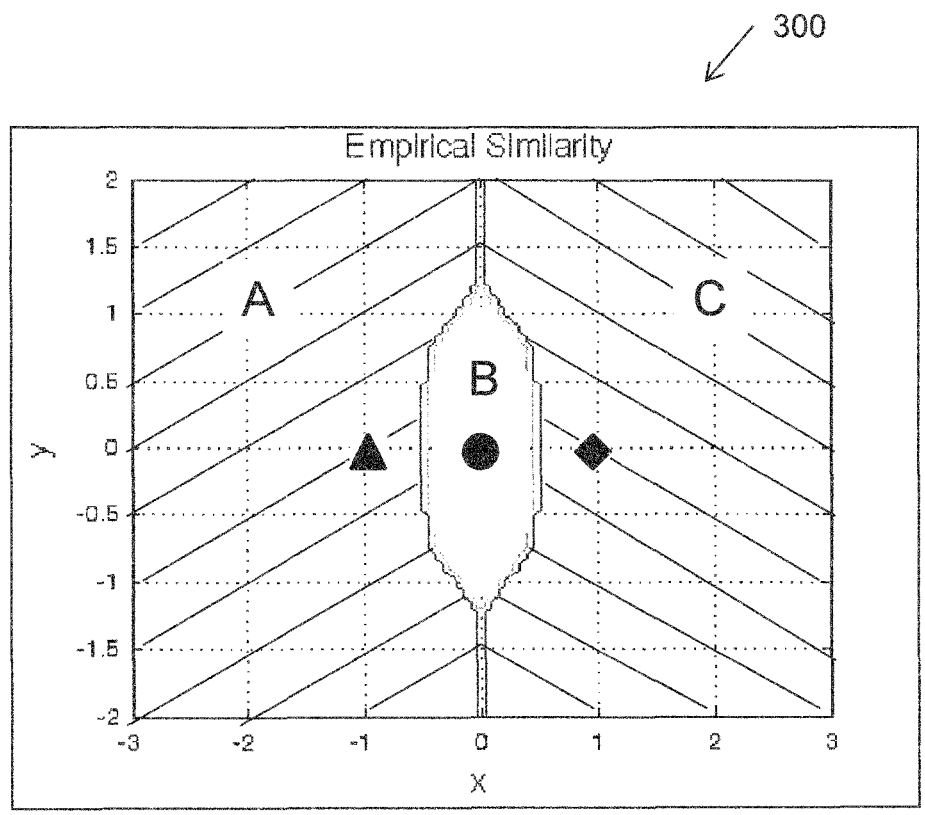
FIG. 3 illustrates results of one embodiment of similarity analysis with tri-point data arbitration given an example set of data points.

Using tri-point arbitration with an arbiter point that represents the data set yields more appealing and practical similarity results than using a traditional two point distance approach. FIG. 3 graphically illustrates a similarity metric 300 that classifies data points as being more similar to either triangle (coordinates −1,0), circle (coordinates 0,0), or diamond (coordinates 1,0). Analysis begins by considering all possible pairs of points {triangle, x} using the other two as a set of analysts: A\triangle={diamond, circle}. The corresponding ρETAC(triangle, x|A\triangle) are computed. The same procedure is repeated for all pairs {diamond, x} and A\diamond={triangle, circle} and for the circle. All points for which ρETAC(diamond, x)>max(ρETAC(triangle, x), ρETAC(circle, x)) are marked as points similar to diamond. And similarly points similar to triangle and circle are marked.

The resulting structuring is presented in FIG. 3. All points lying in the // hashed region A are similar to the triangle point. All points lying in \\ hashed region C are similar to the diamond point. All points within the un-hashed region B are similar to the circle point. Note that there are regions in which distance-wise points may be closer to the "circle" point but are actually more similar to triangle or diamond. Given a query point q one finds the most similar object from the data set {"red", "green", "blue"} by determining in which region the point q falls.

Figure 4:
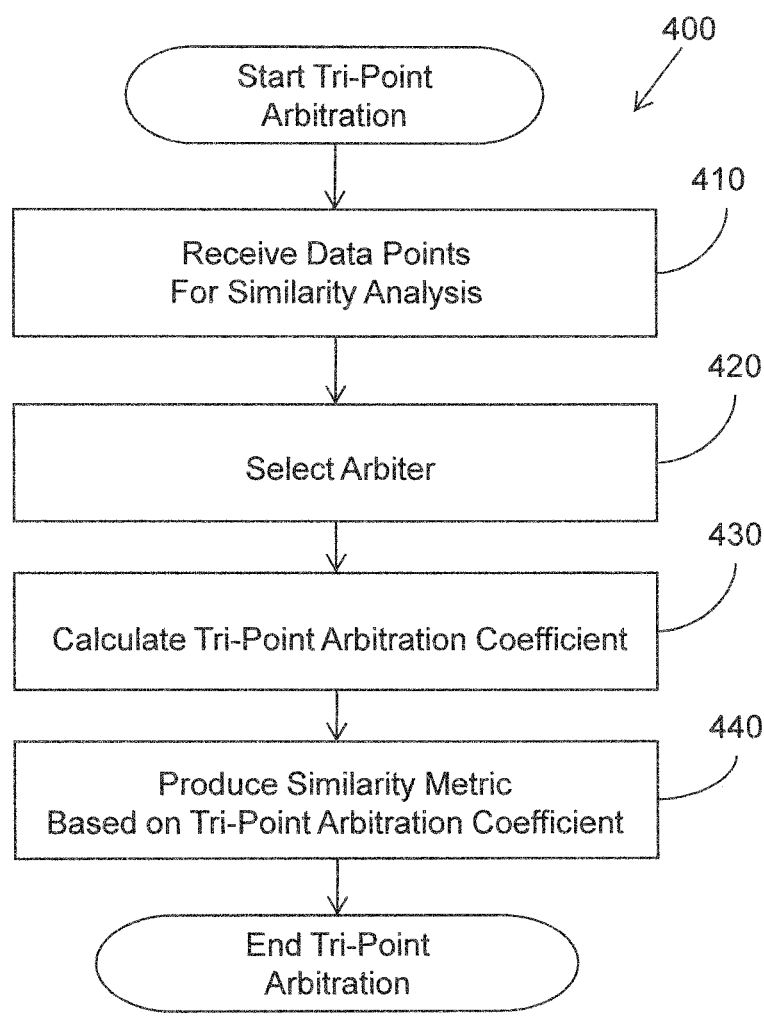
FIG. 4 illustrates an embodiment of a method associated with similarity analysis with tri-point data arbitration.

FIG. 4 illustrates one embodiment of a method 400 for performing tri-point arbitration. The method includes, at 410, selecting a data point pair including a first data point and a second data point from the data set. The method includes, at 420, selecting an arbiter point that is representative of the data set. At 430, the method includes calculating a tri-point arbitration coefficient for the data point pair based, at least in part, on a distance between the first and second data points and the arbiter point. The method includes, at 440, producing a similarity metric for the data set based, at least in part, on the tri-point arbitration coefficients for data point pairs in the set of data points calculated using the selected arbiter point.

Arbiter Point Selection

In the embodiments discussed above, the set of arbiters is in some way representative of the data set itself. For example, the arbiter points used to determine similarity between two points may be all other points in the data set, an arbitrary subset of data points from the data set, a statistical representation of the data set, and so on. In one embodiment, the set of arbiter points is not directly representative of the data set. For example, a set of doctors may be used as a set of arbiters for determining similarity between patient data. Thus tri-point arbitration can be performed with respect to any set of arbiters, and in this manner the perspective used to determine similarity is expressed in the selection of arbiters.

Processing Queries to Find Similar Points

Figure 5:
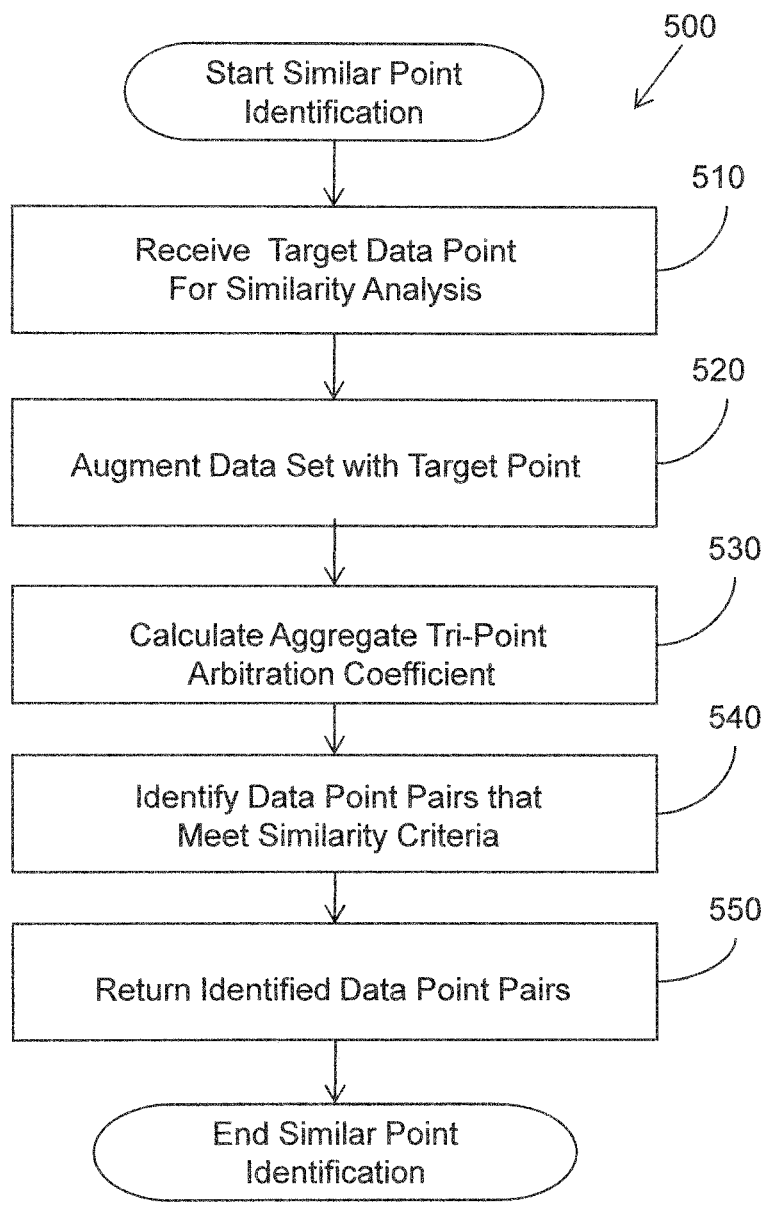
FIG. 5 illustrates an embodiment of a method associated with similarity analysis with tri-point data arbitration.

FIG. 5 illustrates one embodiment of a method 500 that uses tri-point arbitration to return data points that are similar to a target data point in response to a query that specifies the target data point. Recall the example of the doctor searching for patients that are similar to her patient. The method includes, at 510, receiving a query to return data points in a data point set that are similar to a target data point. The method includes, at 520, augmenting the data set with the target data point. Thus, the data set is augmented with a target data point that describes the doctor's patient (the target data point may include 100s of attributes).

The method includes, at 530, calculating respective aggregate tri-point arbitration coefficients for respective data point pairs in the augmented data set. The aggregate tri-point arbitration coefficients are calculated by determining a set of arbiter points that represent data in the augmented data set. For each data point pair in the augmented data set and each arbiter point in the set of arbiter points: i) an arbiter point is selected from the set of arbiter points; ii) a tri-point arbitration coefficient is calculated for the data point pair given the selected arbiter based, at least in part, on a distance between the data point pair and the selected arbiter point; and iii) tri-point arbitration coefficients calculated for the data point pair are aggregated to produce the aggregate tri-point arbitration coefficient for the data point pair.

The method includes, at 540, identifying data point pairs that have aggregate tri-point arbitration coefficients that, when the target data point is used as the arbiter, meet a similarity criteria as similar data point pairs. For example, a row or column in a pair-wise matrix of tri-point arbitration coefficients that corresponds to the target data point may be analyzed to return positive values which indicate similarity between a data point pair and the target data point. The method includes, at 550, returning the similar data point pairs.

Distances between points and arbiters may be combined in different ways to compute a similarity metric for the points. In one embodiment, as described above, for a pair of points, the distances between attributes of the pair of points and an arbiter point are combined to compute a "per-arbiter similarity." The per-arbiter similarities are combined to compute the similarity metric for the pair of points. In one embodiment, for each pair of data points, the per-arbiter similarities for all arbiters are combined into the similarity metric by taking an average of the per-arbiter similarities for the data points.

In one embodiment, the distance between two points is computed using all numerical attributes. Multi-dimensional data is combined into a single distance measurement and this distance measurement is used to determine the similarity between the arbiter and a pair of points. This approach can be difficult to apply to situations with non-numeric data. For example, if two of the attributes are a person's age and gender, then the "distance" between male and female has to be artificially converted to a number that can be compared with age difference.

In one embodiment, instead of the average of the similarity metrics, a number of arbiters who deem the pair of points similar is used as the similarity metric. The minimum threshold value for the similarity metric that will result in data points being deemed similar by an arbiter may be varied, depending on a desired degree of similarity or other statistics-based factors as described below. The similarity metric for each pair of data points becomes an entry in the similarity matrix $M_{TAC}$.

Per-Attribute Tri-Point Similarity Analysis

In another embodiment that may be more suitable for data containing non-numeric attributes converted into numeric values, the arbiter and a pair of points are compared in each dimension separately and then the results of the comparison for all arbiters in each dimension are combined to create an overall comparison. This approach is useful i) for non-numerical data, such as binary yes/no data or categorical data, ii) when the magnitude of the difference in a dimension doesn't matter, or iii) when some of the data attributes are more important than others. In this embodiment, the distances between attributes of the points and each given arbiter are not combined to compute per-arbiter similarities. Instead distances between attributes of the points and the arbiters are combined on a per attribute basis for all the arbiters to compute "per-attribute similarities." The per-attribute similarities are combined to compute the similarity metric.

Figure 6:
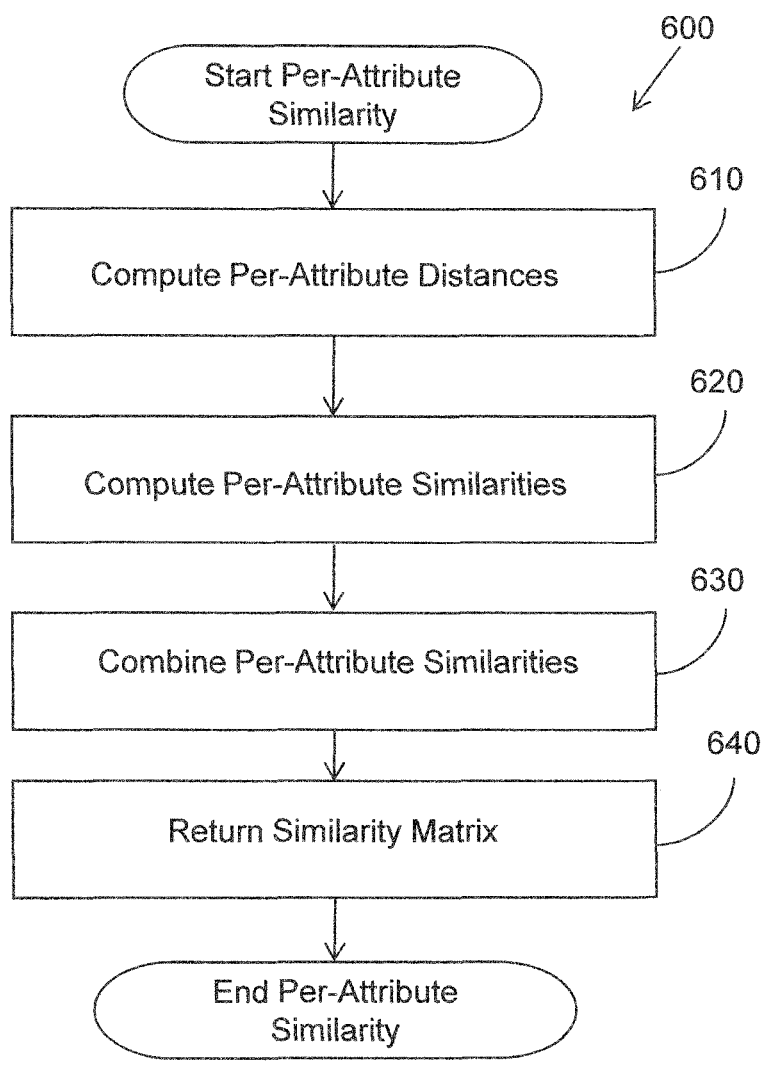
FIG. 6 illustrates an embodiment of a method associated with data clustering using tri-point data arbitration.

FIG. 6 illustrates one embodiment of a method 600 that computes per-attribute similarities to create the similarity metrics in the similarity matrix $M_{TAC}$. At 610, for a data set D, distances between each pair of data points are computed for each attribute. Distances between attributes of different types may be computed differently as described below. In the described embodiment, for each pair of data points, the other N-2 data points are arbiters. In other embodiments, a subset of data points, a statistical representation of the data points, or a set of arbiters not selected from the data set itself may be used as arbiters.

At 620, a per-attribute similarity is computed based on the distances, in the attribute, between the arbiters and each member of the pair of data points. The per-attribute similarity may be a number between −1 and 1.

If the arbiter is farther from both of the data points in the pair than the data points in the pair are from each other, then the pair of data points is similar to each other, for this attribute, from the point of view of the arbiter. Depending on the distances between the arbiter and the data points, the per-attribute similarity will be a positive number less than or equal to 1.

Otherwise, if the arbiter is closer to either of the data points in the pair than the data points are to each other, then the pair of data points is not similar to each other, for this attribute, from the point of view of the arbiter. Depending on the distances between the arbiter and the data points, the per-attribute similarity will be a negative number greater than or equal to −1.

When the arbiter and the data points are equidistant from one another, the data points may be deemed similar to one another, or this attribute and this arbiter may not be included in the similarity analysis. The similarities for each attribute for a given arbiter are combined to create a similarity metric for the pair of data points with respect to the given arbiter.

Per-attribute distances can be combined in any number of ways to create a per-attribute similarity. Per-attribute distances can be weighted differently when combined to create a per-attribute similarity. Per-attribute distances for a selected subset of arbiters may be combined to create the per-attribute similarity. For example, all distances for a given numeric attribute for all arbiters can be combined for a pair of points to create a first per-attribute similarity, all distances for a given binary attribute can be combined for the pair of points to create a second per-attribute similarity, and so on.

At 630, the per-attribute similarities are combined into the similarity metric for the data point pair. The similarity metric may be computed as an average of the per-attribute similarities for the data points. The per-attribute similarities may be combined in any of a number of ways to compute the similarity metric. In one embodiment, a proportion of per-attribute similarities that indicate similarity may be used as the similarity metric. For example, if two data points are similar in a 3 out of 5 attributes, then the data points may be assigned a similarity metric of 3/5. At 640, the per-attribute similarity matrix is returned.

Certain data points may be missing data for some attributes due to sampling or recording issues. One way to account for missing attribute data in one or both of a pair of data points, or the arbiter point, is to not count that attribute in the overall distance/similarity metric calculation for the data point pair. This does result in similarity metrics for different pairs of data points that are based on different subsets of attributes.

Distance Calculation Techniques

The similarity depends on a notion of distance between the pair of data points being analyzed and the arbiter point. Any technique for determining a distance between data points may be employed when using tri-point arbitration to compute the similarity. Distances may be calculated differently depending on whether a data point has a numerical value, a binary value, or a categorical value. In one embodiment, all types of data points are converted into a numerical value and a Euclidean distance may be calculated. In general, some sort of distance is used to determine a similarity ranging between −1 and 1 for a pair of points using a given arbiter point. A few examples of techniques for determining distance and/or similarity for common types of data types follow.

Distance between data points having a numerical value, such as age, blood pressure, and counts may be calculated as a difference or relative difference between the data point values. The distance may also take into account the range and meaning of the data values. For example, the physiological difference between a 1 year old and a 21 year old is normally far greater than the difference between a 21 year old and a 41 year old. To capture this information in the distance calculation, the distance between ages may be computed as a ratio between ages rather than a simple difference between ages. Any other function that captures information about the similarity between data points may be used to calculate distance between numerical data points.

For binary data, which includes gender, yes/no, right-handed/left-handed, and so on, the distance can be assigned a value of 1 if a pair of points has the same value or −1 if the pair of points has opposite values. However, the similarity for the same pair of points might be different depending on the arbiter point's value. If the pair of points have different values, regardless of the arbiter's value (which will coincide with the value of one of the points), then the similarity is determined to be −1. If the pair of points have the same value and the arbiter point has the opposite value, the similarity is determined to be 1. If the pair of points and the arbiter point all have the same value, the similarity may be determined to be 0, or the similarity for this arbiter and this pair of points may be excluded from the similarity metric computed for the pair of points. Put another way, the similarity between binary attributes of a data point pair can be determined as 1 if a Hamming distance between $(x_1)$ and $(x_2)$ is less than both a Hamming distance between $(x_1)$ and (a) and a Hamming distance between $(x_2)$ and (a). The similarity between binary attributes of a data point pair can be determined as −1 if the Hamming distance between $(x_1)$ and $(x_2)$ is greater than either the Hamming distance between (x1) and (a) or the Hamming distance between $(x_2)$ and (a). The similarity between binary attributes of a data point pair can be determined as 0 (or undefined) if a Hamming distance between $(x_1)$ and $(x_2)$ is equal to both the Hamming distance between $(x_1)$ and (a) and the Hamming distance between $(x_2)$ and (a).

For categorical data where values are selected from a finite set of values such as types of employment, types of disease, grades, ranges of numerical data, and so on, the distance can be assigned a value of 1 if a pair of points has the same value or −1 if the pair of points has different values. However, the similarity for the pair of points might be different depending on the arbiter point's value. If the pair of points have different values, regardless of the arbiter's value (which will coincide with the value of one of the points), then the similarity is determined to be −1. If the pair of points have the same value and the arbiter point has a different value, the similarity is determined to be 1. If the pair of points and the arbiter point all have the same value, the similarity may be determined to be 0, or the similarity for this arbiter and this pair of points may be excluded from the similarity metric computed for the pair of points. Based on a priori assumptions about similarity between category values, fractional similarity may be assigned to data point values that express degrees of similarity. For example, for data points whose values include several types of diseases and grades of each disease type, a similarity of ½ may be assigned to data points having the same disease type, but a different grade.

A set of if-then rules may be used to assign a similarity to data point pairs given arbiter values. For example, if a data point can have the values of cat, dog, fish, monkey, or bird, a rule can specify that a similarity of 1/3 is assigned if the data points are cat and dog and the arbiter point is monkey. Another rule can specify that a similarity of −2/3 is assigned if the data points are cat and fish and the arbiter point is dog. In this manner, any assumptions about similarity between category values can be captured by the similarity metric.

Data Clustering Using Tri-Point Arbitration

Clustering, as a data analysis tool, creates groups of data that are "close" together, where "close" implies a distance metric that is used as a proxy for similarity. Both unsupervised and supervised clustering are based on pair-wise comparison of data points in the data set. The comparison is done by computing distances defined for the type of data or by devising heuristic scores that capture the analyst's subjective intuition and/or experience about similarity of data objects. When the attributes are numeric or can be converted to numeric, distance metrics, such as the Euclidean distance between two points shown in Equation (1) below, are applicable. This distance is based on a certain attribute or on attribute combinations, represented by the $a_i$–$b_i$ for k attributes in Equation (1). For example, subgroups in a group of patients can be identified based on attributes such as age, gender, results of a certain test, type of disease, disease progression level, and/or genetic characteristics.

$$d(a,b) = \sqrt{(a_1-b_1)^2 + \ldots + (a_k-b_k)^2} \quad (1)$$

As an input to most clustering techniques, the distances between all pairs of points are calculated and stored, creating the distance matrix shown in Equation (2).

$$M_d = \begin{pmatrix} d(x_1, x_1) & \ldots & d(x_1, x_k) \\ & \ldots & \\ d(x_k, x_1) & \ldots & d(x_k, x_k) \end{pmatrix} \quad (2)$$

Among the most notable and widely used clustering algorithms are K-means clustering, hierarchical clustering, density-based clustering, distribution based clustering, and self organized clustering. Any of these methods may benefit from the use of tri-point arbitration to determine the distance or similarity between points. A tri-point clustering algorithm that is enabled by and devised based on tri-point arbitration to determine similarity is described with respect to FIGS. 8 and 9.

K-means clustering creates k clusters by selecting k central locations, called centroids because they are usually the mean of the points in the cluster, and assigning each point to the nearest centroid based on Euclidean distance. An algorithm then iterates centroid selection to minimize the total sum of the distance from each data point to its nearest centroid. This creates spherical or elliptical clusters in n dimensions. The analyst specifies the number of centroids as an input parameter. The resulting clusters may vary significantly depending on the initial starting point and input number of clusters. Therefore, multiple runs and additional analysis may be required before the clustering results can be used.

In hierarchical clustering each point is initially a cluster, and the closest clusters are iteratively combined. The value of "close" can be measured by one of many metrics, as selected by the analyst, such as minimum, maximum, or average distance among cluster members. The algorithm stops combining clusters when the clusters are too far apart to be merged (an analyst selected distance criterion) or when there is a sufficiently small number of clusters (an analyst selected number criterion). It is also possible to perform hierarchical clustering top-down by starting with all the points in a single cluster and progressively splitting the clusters.

Density-based clustering (DBSCAN) starts with any point and grows a cluster by adding all points within a certain distance of the point and then adding all points within the same distance of those points. This method determines the number of clusters rather than requiring an initial number of clusters and can create clusters of arbitrary shapes. The analyst specifies the expected density of points in clusters or a threshold distance as a required input, which shapes up clustering results in accordance with the analyst's input.

In distribution-based clustering, clusters are defined as objects belonging to the same distribution, and statistical methods are used to find the clusters. This method assumes that distributions that fit the data can be defined and often suffers from overfitting complex models, especially for high-dimensional spaces.

Self-organized clustering is a combination of clustering followed by multi-dimensional projection for plotting. The clustering part of the algorithm(s) are very similar to algorithms used for k-means clustering. The analyst specifies the structure of the map to be used, which affects the resulting grouping. Self-organized clustering typically requires a large number of training points. The result may be significantly altered by presence of anomalous data points of "irrelevant" factors.

The attribute-based groupings found by cluster analysis may seem a natural division of the data but may not be effective for the purpose of the clustering, e.g., for treatment selection and predicting the outcome of a treatment regimen. Therefore, additional information is typically used in cluster creation to obtain better results. For example, for a group of patients treated with a certain drug, additional information can be available that indicates how well the treatment worked. In such situations, the analyst can evaluate the clustering based on patient attributes using the treatment results as a measure of the goodness of the grouping, and adjust the grouping algorithms to optimize the clustering. In this context, "optimize" means that when a new patient's attributes correlate with patients in a cluster, the response of the patient to treatment is similar to that of the patients in the cluster. This involves an element of supervision due to the introduction of a feedback mechanism into attribute-based clustering.

In essence, for distance-based clustering, the distance between the two points serves as a proxy for the similarity of two points. During the clustering process, the analyst adjusts parameters of the clustering process based on what the analyst thinks is similar and what is not. For example, using K-means clustering, the analyst would select a number of clusters that seems to give good results; using density-based clustering, the analyst would select a distance that seems to give good results. While this subjective approach may work in some situations, it will most likely fail in other situations or for slight changes in the underlying structure of the data or the data-generating mechanism. The analyst, by adjusting the parameters, may achieve arbitrarily accurate results on the existing set of data points, but an algorithm overfit to the existing data will produce arbitrarily uncertain results on new data. Such sensitivity to slight changes in the assumptions makes the resulting diagnostics systems unstable and unreliable for predictions based on the clusters.

The disclosed data clustering uses tri-point arbitration to evaluate the similarity between the data points. Rather than an analyst artificially specifying a distance that is "close enough," a number of clusters, a size of cluster, or a cluster forming property such as density of points, in the disclosed data clustering each data point contributes to the determination of the similarity of all other pairs of data points. In one embodiment, the similarity determination made by the data points are accumulated, and pairs of data points that are determined to be similar by some aggregation of arbiters, such as a majority rule, are grouped in the same cluster. Aggregation can be based on any sort of distance metric or other criterion as described later, and each attribute or a group of attributes can be evaluated separately when aggregating. The analyst may alter the behavior of the aggregation rules, such a majority thresholds, but these parameters can be based on statistical analysis of the probability that randomly selected data would be voted to be similar, rather than on the analyst's intuition. Thus, the data, rather than the analyst, controls the cluster formation.

Figure 7:
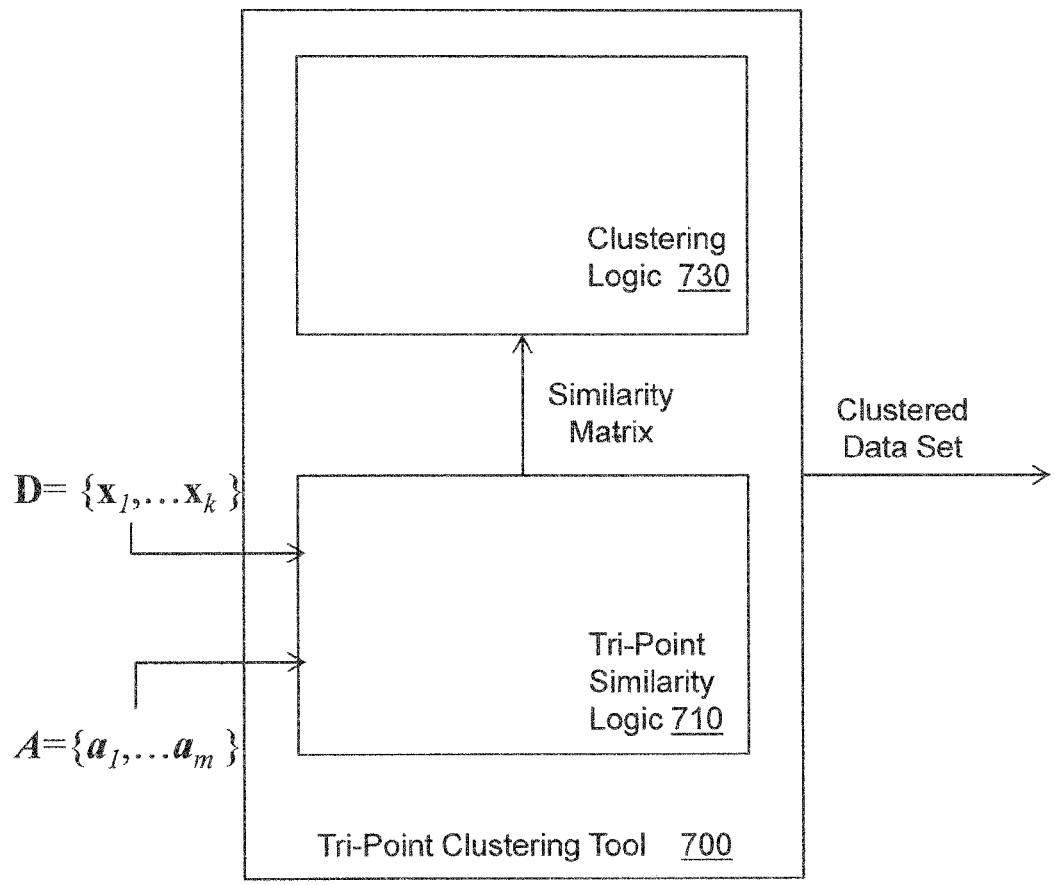
FIG. 7 illustrates an embodiment of a system associated with per-attribute similarity analysis with tri-point data arbitration.

FIG. 7 illustrates an example embodiment of a tri-point clustering tool 700. The tri-point clustering tool 700 is configured to use a set of one or more arbiter points A that are representative of a data set D to cluster similar data points in the data set. A first data point (x1) and a second data point (x2) are determined to be similar by an arbiter point (a) when a distance between (x1) and (x2) is less than: i) a distance between (x1) and (a) and ii) a distance between (x2) and (a).

The tri-point clustering tool 700 includes a tri-point similarity logic 710 and a clustering logic 630. The tri-point similarity logic 710 uses tri-point arbitration to produce a similarity matrix as shown below and as described above with reference to FIGS. 1-6. Given a data set D and a set of arbiters A to be used for clustering, the tri-point similarity logic 710 computes the similarity matrix on pair-wise tri-point arbitration coefficients as:

$$M_{TAC} = \begin{matrix} \rho TAC(x_1, x_1 \mid A) & \ldots & \rho TAC(x_1, x_k \mid A) \\ \rho TAC(x_2, x_1 \mid A) & \ldots & \rho TAC(x_2, x_k \mid A) \\ & \ldots & \\ \rho TAC(x_k, x_1 \mid A) & \ldots & \rho TAC(x_k, x_k \mid A) \end{matrix} \quad (3)$$

Where $$\rho TAC(x_i, x_j \mid A) = \frac{1}{|A|} \sum_{k=1}^{|A|} \rho TAC(x_i, x_j \mid a_k)$$

The entries of the matrix are computed using simple averaging over arbiters. Any number of different weighting schemes may also be used. Each entry of the matrix is a number between −1 and 1, with 1 indicating perfect similarity between a data point pair and −1 indicating perfect dissimilarity.

Data Clustering

The clustering logic 730 inputs the similarity matrix computed by the tri-point similarity logic 710. The similarity matrix records the similarity metric for each pair of data points as determined by some predetermined set of arbiter points that may be representative of the other data points in the data set.

Thresholds for Similarity

The clusters that will be created using tri-point arbitration, especially the size of the clusters, are dependent on the criteria used to identify similar points. Two criteria affect the similarity determination. A first criterion specifies what similarity/distance will cause a pair of data points to be determined as similar with respect to a given arbiter. A second criterion specifies what will cause a pair of data points to be determined as similar with respect to the entire set of arbiters. In embodiment, the first criterion is a positive similarity metric and the second criterion is that 50% of all arbiters identify the data points as similar.

Unlike other clustering techniques, a user does not have to input thresholds or other parameters such as the number of clusters for k-means clustering. In one embodiment, a threshold on the similarity metric that is greater than 0, such as 0.25, is used to require more significant similarity for clustering purposes. In one embodiment, a range of near-zero values for the similarity metric are identified. Any arbiters that yield a similarity metric for a pair of data points that falls within the range do not vote on the similarity of the data points.

Another variation is using statistical estimates to set the thresholds rather than subjective estimates. For example, for a distance based attribute, the probability of any 2 points out of 3 random points being the closest is 1/3, so the probability that an arbiter determines a pair is similar in a distance based attribute is 1/3 if all 3 points are randomly selected. If there are 2 independent distance based attributes, then the probability that the arbiter determines the pair is similar on neither attribute is 4/9 (2/3×2/3), similar on 1 is 4/9 (2/3× 1/3+2/3×1/3), and similar on 2 is 1/9 (1/3×1/3). Probabilities for other attributes can be determined similarly and combined using simple statistics to determine the probability distribution for the distance metric.

For example, if there are 3 distance based attributes, the probability that an arbiter determines a random pair of points is similar based on more than half (2 or 3) of the attributes being similar is 0.26. If there are 8 arbiters that each have a 0.26 probability of determining a random pair of points is similar, the probability that more than half (5 or more arbiters) determine a random pair of points is similar is 0.03. This kind of analysis provides a confidence level that can be used by the analyst for selecting appropriate measurements and thresholds.

When the attributes are independent, it is possible to use simple statistics to set a similarity threshold. For tri-point clustering, a similarity metric ranging from −1 to +1 is provided. For 3 random points comprising a pair and an arbiter, this measurement would be negative 2/3 of the time and positive 1/3 of the time. This is because the closest 2 out of 3 random points are equal with a probability of 1/3, so a random arbiter would determine that a random pair is close together 1/3 of the time. The Binomial distribution can be used to decide the probability that k or more out of n arbiters determine that the pair is close when a single arbiter has a probability p of determining that the pair is close:

$$\sum_{i=k}^{n} \binom{n}{k}(p)^i(1-p)^{n-i} \quad (4)$$

For 100 data points, there are 98 arbiters per pair. With p=1/3, the probability that half (49) or more of the arbiters determine that the pair of data points is similar is 0.05% for random points. Therefore, if a pair of data points is similar using a 50% threshold for the number of arbiters, it is highly probable that the pair of data points actually is similar. Besides randomness, this assumes a continuous distance measurement, which may not be true for binary and categorical data. In those cases, accommodations may need to be made such as the ones described in the following for per-attribute similarity.

For similarity-by-attribute, the binomial equation above applies on a per-attribute basis to continuous data. It is used on a recursive basis with n=number of attributes, k=threshold, e.g., half, and p=result from the binomial equation (4). For example, with 100 data points, p=0.05% from the previous paragraph. With 5 attributes, the chance that a pair of data points would be considered close in 3 or more attributes (n=5, k=3, p=0.0005) would be less than $10^{-12}$. This analysis can be modified for binary or categorical data. For binary data, if a pair of data points is determined to be similar whenever they have the same value (0 or 1, true or false, male or female, etc.), then p=0.5, and the probability that a pair of data points is similar will be 0,5. If instead, a pair of data points is determined to be similar only when they have the same value and the arbiter has a different value, then p=0.25, and the random probability that a pair of data points is voted close will be low.

The above calculations assume that the data is uniformly distributed. If 75% of the people in the sample are female, then the probability that 2 randomly chosen people are female is much higher than if the sample was 50% female. Let $b_0$ be the probability that a sample value is 0, e.g., the fraction of the sample that is the value 0, and let $b_1$ be the probability that a sample value is 1. Then the probability that 2 random points would match in that attribute is $b_0^2+b_1^2$. That is the appropriate value to use for p in the binomial equation (4) if a pair of data points is determined to be similar when they have the same value. If a pair of data points is determined to be similar only when they have the same value and the arbiter has a different value, then $p=b_0^2 b_1+b_1^2 b_0$.

For example, if the patient population is 90% male and 10% female, the probability that a random pair is the same gender is 82% (0.9×0.9+0.1×0.1) rather than 50%. To some degree, the tri-point arbitration automatically accounts for non-uniform distributions. If a pair of patients is male, then most of the other data points will have a tri-point arbitration coefficient of 0, at least for this attribute, because they are also male while 10% will have a tri-point arbitration coefficient of 1 because they are female. If a pair of patients is female, then 90% of data points will have a tri-point arbitration coefficient of 1 because they are male, which is a much more positive response. It would be likely to cluster all females together, but males would be likely to be in multiple clusters depending on other attributes. Thus, rare attribute values have more weight in cluster formation using tri-point arbitration.

For ternary data such as 3 categories, let $b_2$ be the probability that the attribute has the third value, and the same ideas apply. If a pair of data points is determined to be similar only when they have the same value, $p=b_0^2+b_1^2+b_2^2$. A more reasonable choice is $p=b_0^2(1-b_0)+b_1^2(1-b_1)+b_2^2(1-b_2)+2b_0 b_1 b_2$, where the first 3 terms are the probability that the pair of data points have the same value which is a different value than the arbiter, and the last term is the probability that all 3 have different values and the pair have the closer values. In all these cases, it is possible to use an equation like the binomial equation (4) to determine the probability that a random arbiter would say a random pair is similar.

In various described embodiments, all data points are used as arbiters. It is also possible to subset the data or arbiters into groups and compare or combine clusters. In one embodiment, data points are initially assigned to multiple clusters, and a final cluster assignment is based on an aggregation rule involving only points in the cluster. In some cases it may be reasonable to have points that reside in multiple clusters, e.g., a car model type might belong in both a sports car cluster and a luxury car cluster. One algorithm variation is to assign points to multiple clusters, e.g., point B would be in a cluster with A and C if it was close to both of them, but A and C would be in different clusters because they are not close.

Figure 8:
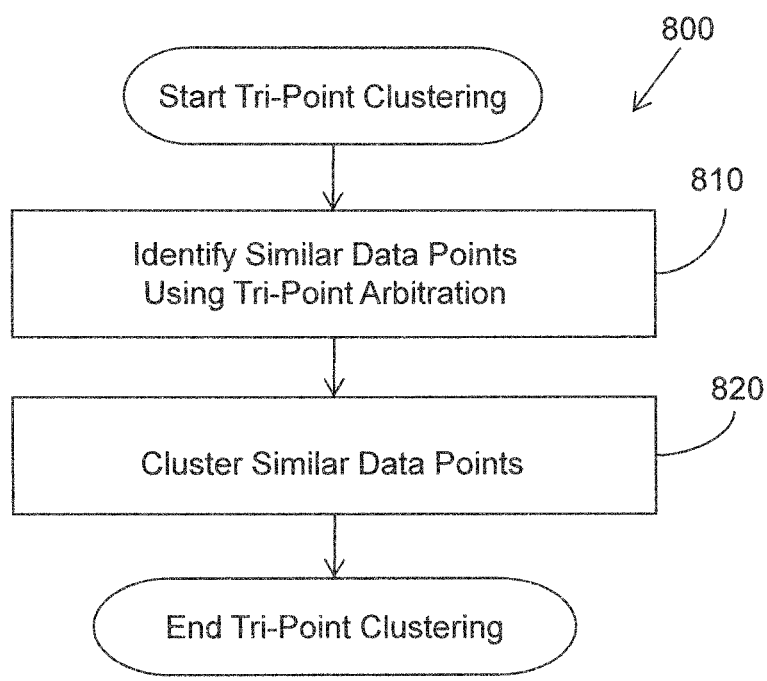
FIG. 8 illustrates an embodiment of a method associated with data clustering using tri-point data arbitration.

FIG. 8 illustrates an example embodiment of a tri-point clustering method 800. The method 800 may be employed by the clustering logic 630 to cluster data points using the similarity matrix computed by the tri-point similarity logic 710. At 810, similar data points are identified. The data points are identified as being similar using tri-point arbitration as described above. For example, if a similarity matrix that records similarity metrics for data point pairs taken with respect to an aggregate of arbiter points is used, data point pairs having a similarity metric greater than some threshold value are identified as similar. For example, data points having a positive similarity metric may be identified as similar. If a greater degree of similarity is desired, a higher threshold on the similarity metric, such as ¼, may be used to identify similar data points.

In one embodiment, a majority rule is used to identify similar data points. In this embodiment, a number of arbiter points that identify a given data point pair as being similar is tallied for each data point pair. If a certain aggregation of arbiter points indicates that the data point pair is similar, then the pair of data points is identified as similar for clustering purposes. For example, if for a majority of arbiter points the tri-point similarity coefficients are positive, the data points may be identified as similar. Arbiter aggregation may be performed on a per-attribute basis or a per-attribute-group basis. Data point pairs identified as similar on a given number of attributes, or on selected attributes, may be identified as similar for clustering purposes. Alternatively, data points may be identified as similar on a per-attribute basis.

At 820, similar data points are clustered. Different criteria for membership in a cluster may be used. For example, data points that are similar to at least one other data point in the cluster may be included in the cluster. Data points may be assigned to all clusters that include at least one data point to which they are similar. Membership in a cluster may be limited to data points that are similar to at least a threshold number of other data points in the cluster. Clusters may be merged when a first cluster contains a threshold number of data points that have a similar data point in a second cluster.

Figure 9:
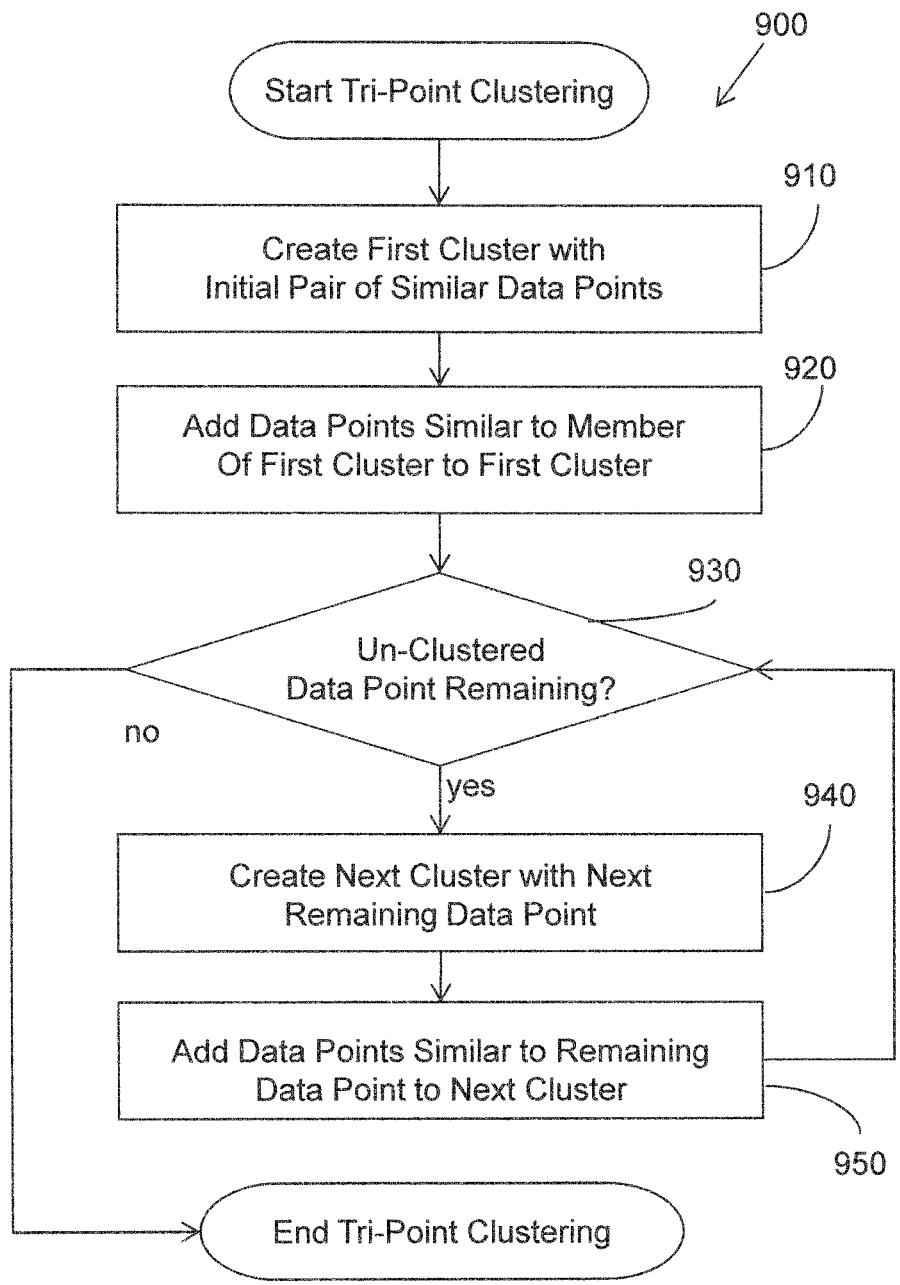
FIG. 9 illustrates an embodiment of a method associated with data clustering using tri-point data arbitration.

FIG. 9 illustrates an example embodiment of a method 900 for performing tri-point arbitration clustering. At 910, a first cluster is created with an initial pair of similar data points. As already discussed, a threshold on similarity may be established for cluster membership. At 920, data points that are similar to a member of the first cluster are subsumed into the first cluster until there are no remaining data points that are similar to a member of the first cluster. At 930, a remaining un-clustered data point, if any, is identified. At 940, a next cluster is created for the identified data point. At 950, the next cluster is grown by adding data points that are similar to the identified remaining data point until no data points remain that are similar to the identified remaining data point. The method continues until no remaining unclustered data points remain at 930 and the clustering is complete.

Tri-Point Data Clustering Example

Referring now to FIG. 10, this section contains an example of applying the tri-point arbitration clustering method to a common disease. There are about 500 patient data records, of which 10 are randomly selected for this example. The relevant attributes are shown in table 1000. The objective of this exemplary study is to group patients and then see if those groups show similar outcome characteristics (as shown by "outcome" column).

While patient data is used in this example, tri-point clustering may be performed on any type of data upon which distances between data point attributes can be computed. Other types of patient data include genomic, clinical, environmental, and socio-economic data. Audio and visual data is also well suited for tri-point similarity analysis and clustering.

The attributes in the table 1000 and appropriate distance metrics for them are as follows. Attribute1 is the patient's age at initial diagnosis. Distance between ages is determined as the absolute value of the difference in the ages, the standard metric for a numerical value. If either member of the pair or the arbiter has a null value, this attribute is not used to compute a similarity metric. Note: an alternative for an arbiter null value would be to determine that the pair of points is similar to the arbiter if the distance between the pair is less than the average pair-wise distance.

Attribute2 (male/female) is scored as described earlier for binary data. The pair of data points is similar is they have the same gender and the arbiter has a different gender. The pair is different is they have different gender. If the pair and arbiter all have the same value, the attribute gets a similarity metric of 0.

Attribute3 performance score (0-100) quantifies patients' general well-being and activities of daily life with a score of 100 meaning unimpaired. This numeric data attribute uses the same distance metric as age.

Attribute4 (yes/no) is disease specific parameter. This binary data attribute uses the same similarity metric as gender.

Attribute5 (yes/no) is a disease specific parameter. This binary data attribute uses the same metric as gender.

Attribute5 is a disease specific percentage (0-100). This attribute is treated as binary data for similarity analysis where the binary values are none (0) and some (>0).

Attribute6 is a disease specific percentage (0-100). This attribute is treated as a numeric data attribute, but the similarity is based on the relative value of the difference instead of the absolute value, i.e., $$\frac{|X_1 - X_2|}{\max(X_1, X_2)}.$$

There are 45 pairs of points for which a distance metric is calculated in each of 7 attributes. For example, patients 1 and 2 are similar in binary data Attribute4 and Attribute6, different in binary data gender and Attribute5, have a difference of 20 in Attribute3 performance score, have a relative difference of 0.11=(90-80)/90 in Attribute7, and are not scored on age because patient 2 does not have a value for age.

With N=10, there are 8 arbiters for the 45 pairs of points, meaning 360 calculations for each of 7 attributes. For example, with patient 5 as an arbiter of the pair of points {1,2}, age is not scored (e.g., the similarity for arbiter 5 for the attribute of age is not calculated) because patient 2 does not have a value for age. Attribute3 performance is has a similarity of 0 because the distance is 20 between both 1 and 2 and 1 and 5. Attribute4 has a similarity of 1, Attribute6 has a similarity of 0 because all points have a positive value, and the other 3 attributes have similarity of −1.

The arbiter similarity for each attribute are summed up and divided by the number of attributes that could be scored, a total of 360 scores. For pair {1,2} and arbiter 5, one similarity is −2 out of 6 attributes, or −0.33. For tri-point clustering using Euclidian distance, the distance from 1-2 is −0.23 and the distance from 1-5 and 2-5 are about −0.12, so another similarity for 1-2 with respect to arbiter 5 is −0.47.

Table 1050 shows the pairs of points with average similarity metrics above 0 or that have 5 or more arbiter scores>=0. Points 1 and 2 are not shown as a pair in table 1050 because their score is −0.47 and less than five arbiters determined them to be similar. There are a number of arbiter scores that are 0 because there are few numerical attributes in the data, and they often have identical values, so most attribute scores are −1, 0, or 1. Note that the set of pairs considered as similar depends on threshold values.

Clusters are created depending on threshold values as follows:

{1,2,3,4,5,6,9}, {7,8,10} using number of arbiters scores>=0

{1,2,3,4,5,6,9}, {7,10}, {8} using number of arbiters scores>0

{1,2,3,4,6,9}, {5}, {7,10}, {8} using number of arbiters scores>0.25

{1,2,3,4,5,6,9}, {7,8,10} using average score>0

The final cluster results seem reasonable in terms of outcome.

Patient 8, with the smallest outcome, is grouped by itself or with 2 other patients that have relatively small outcome. The large group of patients all have large outcomes, except Patient 4, which seems to be an outlier. This example is based on a small sample to demonstrate the techniques.

Feature Selection Using Tri-Point Clustering

When a data set has a large number of attributes, often more attributes than data points, it can be difficult to determine similarity and appropriate clusters. It can also be difficult to determine the reason that points were similar or clustered together due to the high dimensionality of the attribute space. This is often called overfitting the model. In these cases, data is often pre-processed using knowledge of the input data or statistical techniques such as principle components analysis to reduce the number of attributes. In machine learning, this is called feature selection when a subset of attributes is selected and feature extraction when subsets of attributes are combined. The assumption when doing feature selection or extraction is that many of the attributes are redundant or irrelevant for the purposes of clustering.

Tri-point arbitration can be used to perform feature selection for similarity measurements and clustering. For example, a first similarity matrix can be computed and then a set of attributes can be removed. A second similarity matrix is computed without the set of attributes. If there are no significant changes, it can be inferred that the removed attributes are not important for the calculations. The same computations can be made for clusters by using tri-point clustering to create clusters, remove a set of attributes, recompute the clusters, and determine if there are any changes. If there are no changes, it can be inferred that the removed attributes are not important for clustering purpose. If there are a small number of changes, an error metric can be used to determine if the changes are within a threshold that is acceptable given the dimensionality reduction achieved.

General Computer Embodiment

Figure 11:
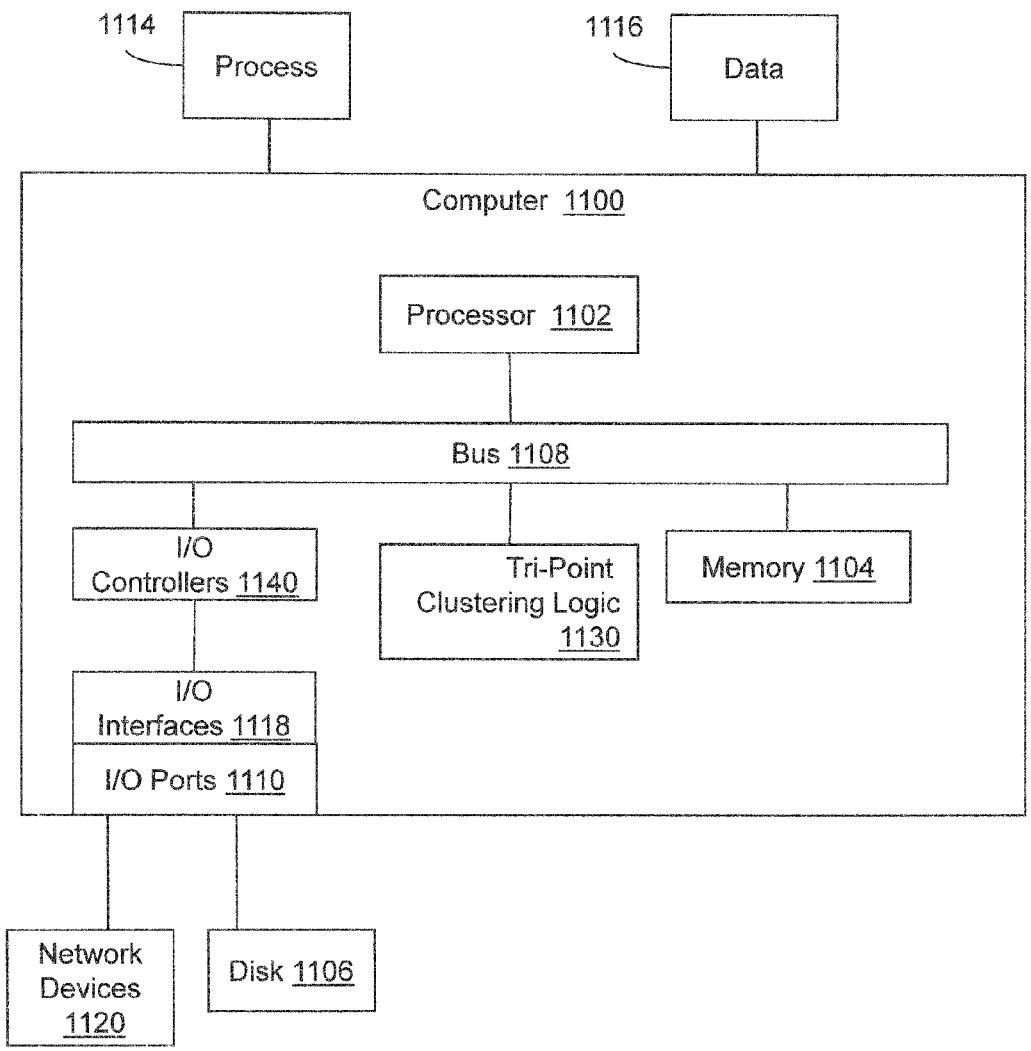
FIG. 11 illustrates an embodiment of a computing system in which example systems and methods, and equivalents, may operate.

FIG. 11 illustrates an example computing device in which example systems and methods described herein, and equivalents, may operate. The example computing device may be a computer 1000 that includes a processor 1102, a memory 1104, and input/output ports 1110 operably connected by a bus 1108. In one example, the computer 1100 may include a tri-point clustering logic 1130 configured to facilitate clustering using tri-point arbitration. In different examples, the tri-point clustering logic 1130 may be implemented in hardware, a non-transitory computer-readable medium with stored instructions, firmware, and/or combinations thereof. While the tri-point clustering logic 1130 is illustrated as a hardware component attached to the bus 1108, it is to be appreciated that in one example, the tri-point clustering logic 1130 could be implemented in the processor 1102.

In one embodiment, tri-point clustering logic 1130 is a means (e.g., hardware, non-transitory computer-readable medium, firmware) for performing clustering analysis using tri-point arbitration.

The means may be implemented, for example, as an ASIC programmed to perform tri-point arbitration. The means may also be implemented as stored computer executable instructions that are presented to computer 1100 as data 1116 that are temporarily stored in memory 1104 and then executed by processor 1102.

The tri-point clustering logic 1130 may also provide means (e.g., hardware, non-transitory computer-readable medium that stores executable instructions, firmware) for performing the methods illustrated in FIGS. 7-10.

Generally describing an example configuration of the computer 1100, the processor 1102 may be a variety of various processors including dual microprocessor and other multi-processor architectures. A memory 1104 may include volatile memory and/or non-volatile memory. Non-volatile memory may include, for example, ROM, PROM, and so on. Volatile memory may include, for example, RAM, SRAM, DRAM, and so on.

A disk 1106 may be operably connected to the computer 1100 via, for example, an input/output interface (e.g., card, device) 1118 and an input/output port 1110. The disk 1106 may be, for example, a magnetic disk drive, a solid state disk drive, a floppy disk drive, a tape drive, a Zip drive, a flash memory card, a memory stick, and so on. Furthermore, the disk 1106 may be a CD-ROM drive, a CD-R drive, a CD-RW drive, a DVD ROM, and so on. The memory 1104 can store a process 1114 and/or a data 1116, for example. The disk 1106 and/or the memory 1104 can store an operating system that controls and allocates resources of the computer 1100.

The bus 1108 may be a single internal bus interconnect architecture and/or other bus or mesh architectures. While a single bus is illustrated, it is to be appreciated that the computer 1100 may communicate with various devices, logics, and peripherals using other busses (e.g., PCIE, 1394, USB, Ethernet). The bus 1108 can be types including, for example, a memory bus, a memory controller, a peripheral bus, an external bus, a crossbar switch, and/or a local bus.

The computer 1100 may interact with input/output devices via the i/o interfaces 1118 and the input/output ports 1110. Input/output devices may be, for example, a keyboard, a microphone, a pointing and selection device, cameras, video cards, displays, the disk 1106, the network devices 1120, and so on. The input/output ports 1110 may include, for example, serial ports, parallel ports, and USB ports.

The computer 1100 can operate in a network environment and thus may be connected to the network devices 1120 via the i/o interfaces 1118, and/or the i/o ports 1110. Through the network devices 1120, the computer 1100 may interact with a network. Through the network, the computer 1100 may be logically connected to remote computers. Networks with which the computer 1100 may interact include, but are not limited to, a LAN, a WAN, and other networks.

In another embodiment, the described methods and/or their equivalents may be implemented with computer executable instructions. Thus, in one embodiment, a non-transitory computer-readable medium is configured with stored computer executable instructions that when executed by a machine (e.g., processor, computer, and so on) cause the machine (and/or associated components) to perform the method.

While for purposes of simplicity of explanation, the illustrated methodologies in the figures are shown and described as a series of blocks, it is to be appreciated that the methodologies are not limited by the order of the blocks, as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional blocks that are not illustrated.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

ASIC: application specific integrated circuit.
CD: compact disk.
CD-R: CD recordable.
CD-RW: CD rewriteable.
DVD: digital versatile disk and/or digital video disk.
HTTP: hypertext transfer protocol.
LAN: local area network.
PCI: peripheral component interconnect.
PCIE: PCI express.
RAM: random access memory.
DRAM: dynamic RAM.
SRAM: synchronous RAM.
ROM: read only memory.
PROM: programmable ROM.
EPROM: erasable PROM.
EEPROM: electrically erasable PROM.
SQL: structured query language.
OQL: object query language.
USB: universal serial bus.
XML: extensible markup language.
WAN: wide area network.

"Computer-readable medium", as used herein, refers to a non-transitory medium that stores instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

In some examples, "database" is used to refer to a table. In other examples, "database" may be used to refer to a set of tables. In still other examples, "database" may refer to a set of data stores and methods for accessing and/or manipulating those data stores.

"Data store", as used herein, refers to a physical and/or logical entity that can store data on a non-transitory computer readable medium. A data store may be, for example, a database, a table, a file, a list, a queue, a heap, a memory, a register, and so on. In different examples, a data store may reside in one logical and/or physical entity and/or may be distributed between two or more logical and/or physical entities.

"Logic", as used herein, includes but is not limited to hardware, firmware, a non-transitory computer readable medium that stores instructions, and/or combinations of each to perform a function(s) or an action(s), and/or to cause a function or action from another logic, method, and/or system. Logic may include a microprocessor controlled by an algorithm, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic. Similarly, where a single logic is described, it may be possible to distribute that single logic between multiple physical logics.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is used herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be used.

What is claimed is:

1. A non-transitory computer-readable medium storing computer-executable instructions that, when executed by of a computer cause the computer to perform functions, the instructions comprising instructions for:
    receiving a set of un-clustered data points to be grouped into one or more clusters;
    calculating respective distances between all pairs of data points in the set of un-clustered data points;
    selecting a set of one or more arbiter points that are representative of the set of un-clustered data points;
    computing a per-arbiter similarity for each pair of data points in the set of un-clustered data points, based at least in part on the distances between data points in the pair with respect to each arbiter point in the set of arbiter points, such that the similarity metric indicates that data points ($x_1$) and ($x_2$) in a given data point pair are similar with respect to a given arbiter point (a) when a distance between ($x_1$) and ($x_2$) is less than: i) a distance between ($x_1$) and (a) and ii) a distance between ($x_2$) and (a);
    combining the per-arbiter similarities for each data point pair to compute a similarity metric for each data point pair;
    identifying data points ($x_1$) and ($x_2$) as similar data points when the similarity metric for ($x_1$) and ($x_2$) exceeds a threshold; and
    grouping the similar data points into the one or more clusters.

2. The non-transitory computer-readable medium of claim 1, wherein the instructions further comprise identifying similar data points by identifying pairs of data points that are determined to be similar with respect to an aggregation of arbiter points in the set of arbiter points.

3. The non-transitory computer-readable medium of claim 1, wherein ($x_1$), ($x_2$), and (a) include one or more numerical attribute values, and further comprising instructions for determining the similarity between ($x_1$) and ($x_2$) based, at least in part, on Euclidean distances between the numerical attributes of ($x_1$) and ($x_2$) and (a).

4. The non-transitory computer-readable medium of claim 1, further comprising instructions for determining the similarity between ($x_1$) and ($x_2$) and (a) using a set of if-then rules that specify a similarity value based on given values of ($x_1$) and ($x_2$) and (a).

5. The non-transitory computer-readable medium of claim 1, wherein ($x_1$), ($x_2$), and (a) include one or more binary attribute values, and further comprising instructions for determining the similarity between the binary attributes of ($x_1$) and ($x_2$) and (a) as:
    i) 1 if a Hamming distance between ($x_1$) and ($x_2$) is less than both a Hamming distance between ($x_1$) and (a) and a Hamming distance between ($x_2$) and (a);
    ii) −1 if the Hamming distance between ($x_1$) and ($x_2$) is greater than either the Hamming distance between ($x_1$) and (a) or the Hamming distance between ($x_2$) and (a); and iii) 0 if the Hamming distance between $(x_i)$ and $(x_2)$ is equal to both the Hamming distance between $(x_1)$ and (a) and the Hamming distance between $(x_2)$ and (a).

6. The non-transitory computer-readable medium of claim 1, wherein data points in the data set each comprise values for a plurality of attributes, further comprising instructions for:
for each arbiter, computing the distance between data points $(x_1)$ and $(x_2)$, and a given arbiter (a) by combining selected per-attribute distances between the data points and (a);
computing a per-arbiter similarity for each arbiter based, at least in part, on the distance; and
combining the per-arbiter similarities to compute the similarity metric.

7. The non-transitory computer-readable medium of claim 1, wherein data points in the data set each comprise a plurality of attribute values; further comprising instructions for:
for each arbiter point (a) in the set of arbiter points, determining a set of per-attribute distances between selected attributes of the data points $(x_1)$, $(x_2)$, and (a), where each set of per-attribute distances includes distances on the same attribute between data points $(x_1)$, $(x_2)$ and the arbiter points; and
for respective sets of per-attribute distances, computing respective per-attribute similarities based, at least in part, on the set of per-attribute distances; and
combining the per-attribute similarities to compute the similarity metric.

8. The non-transitory computer-readable medium of claim 7, further comprising instructions for combining sets of per-attribute distances for a selected group of attributes and computing a single per-attribute similarity for the combined sets of per-attribute distances.

9. The non-transitory computer-readable medium of claim 7, further comprising instructions for determining the similarity metric based on a proportion of per-attribute similarities that indicate that $(x_1)$ and $(x_2)$ are similar.

10. The non-transitory computer-readable medium of claim 7, further comprising instructions for i) determining a first per-attribute similarity based, at least in part, on a first subset of arbiters in A and ii) determining a second per-attribute similarity based on a second subset of arbiters in A that is different than the first subset.

11. The non-transitory computer-readable medium of claim 10, further comprising instructions for i) determining the first per-attribute similarity based, at least in part, on an average of the first per-attribute distances and ii) determining the second per-attribute similarity based, at least in part, on an average of the second per-attribute distances.

12. The non-transitory computer-readable medium of claim 10, further comprising instructions for combining the first per-attribute similarity with the second per-attribute similarity according to a weighting scheme.

13. The non-transitory computer-readable medium of claim 1, wherein data points in the data set each comprise a plurality of attribute values, further comprising instructions for identifying attributes as redundant attributes that do not significantly contribute to similarity analysis for $(x_1)$ and $(x_2)$ by:
selecting a subset of attributes;
computing a second similarity metric for $(x_1)$ and $(x_2)$ by combining the similarity metrics for attributes that are not members of the subset;
comparing the similarity metric with the second similarity metric; and
when a difference between the similarity metric and the second similarity metric is below a threshold, identifying attributes in the subset of attributes as redundant attributes.

14. The non-transitory computer-readable medium of claim 1, further comprising instructions for determining the threshold based, at least in part, on probability that a random pair of data points will be identified as similar by an aggregation of arbiter points.

15. The non-transitory computer-readable medium of claim 1, further comprising instructions for creating the one or more clusters by:
selecting a first data point and a second data point for membership in a cluster, wherein the first data point and the second data point are identified as similar;
adding, as members of the cluster, data points that are similar to any member of the cluster; and
until all data points are members of clusters:
selecting a remaining data point that is not a member of a cluster to form a new cluster;
adding data points that are similar to the remaining data point as members to the new cluster.

16. The non-transitory computer-readable medium of claim 15, further comprising instructions for removing a member data point from a cluster when the member data point is not similar to an arbiter aggregation selected from: a majority of arbiters, a minority of arbiters, an average of arbiters, a weighted average of arbiters, and a threshold number of arbiters.

17. The non-transitory computer-readable medium of claim 16, further comprising instructions for adding a data point to two or more clusters for which the data point is similar to a threshold number of the member data points in the cluster.

18. The non-transitory computer-readable medium of claim 1, where the arbiter points are not members of the data set.

19. The non-transitory computer-readable medium of claim 1, wherein $(x_1)$, $(x_2)$, and (a) include one or more categorical attribute values, and further comprising instructions for:
assigning distance metrics between categorical values of (x1), (x2), and (a);
determining the similarity between (x1) and (x2) based, at least in part, on the assigned distance metrics.

20. A computing system, comprising:
a processor connected to a non-transitory computer readable medium by a communication path;
a tri-point similarity logic stored on the non-transitory computer readable medium and including instructions that when executed by the processor to cause the processor to:
receive a set of un-clustered data points to be grouped into one or more clusters;
calculate respective distances between all pairs of data points in the set of un-clustered data points;
select a set of one or more arbiter points that are representative of the set of un-clustered data points;
compute a per-arbiter similarity for each pair of data points in the set of un-clustered data points, based at least in part on the distances between data points in the pair with respect to each arbiter point in the set of arbiter points, such that the similarity metric indicates that data points $(x_1)$ and $(x_2)$ in a given data point pair are similar with respect to a given arbiter point (a) when a distance between $(x_1)$ and $(x_2)$ is less than: i) a distance between ($x_1$) and (a) and ii) a distance between ($x_2$) and (a);

combine the per-arbiter similarities for each data point pair to compute a similarity metric for each data point pair;

identify data points ($x_1$) and ($x_2$) as similar data points when the similarity metric for ($x_1$) and ($x_2$) exceeds a threshold; and a clustering logic stored on the non-transitory computer readable medium and including instructions that when executed by the processor cause the processor to group the similar data points into the one or more clusters of data points that are similar with respect to each other.

21. The computing system of claim 20, where the tri-point similarity logic is configured to:

for each arbiter point (a) in the set of arbiter points, determine a set of per-attribute distances between selected attributes of the data points ($x_1$), ($x_2$), and (a), where each set of per-attribute distances includes distances on the same attribute between data points ($x_1$), ($x_2$) and the arbiter points; and for respective sets of per-attribute distances, computing respective per-attribute similarities based, at least in part, on the set of per-attribute distances; and combining the per-attribute similarities to compute the similarity metric.

22. The computing system of claim 20, where the clustering logic is configured to:

select a first data point and a second data point for membership in a cluster, wherein the first data point and the second data point are identified as similar;

add, as members of the cluster, data points that are similar to any member of the cluster; and until all data points are members of clusters:
select a remaining data point that is not a member of a cluster to form a new cluster; and
add data points that are similar to the remaining data point as members to the new cluster.

23. The computing system of claim 20, where the arbiter points are all other members of the data set.

24. The computing system of claim 20, where the data points represent patients and attributes include one or more of genomic attributes, clinical attributes, environmental attributes, and socio-economic attributes.

25. The computing system of claim 20, where the data points represent one or more of audio data, visual data, image data, audio stream data, visual stream data, free text data, genome sequence data, structured data, and unstructured data.

26. A computer-implemented method, comprising:

receiving a set of un-clustered data points to be grouped into one or more clusters;

calculating respective distances between all pairs of data points in the set of un-clustered data points;

selecting a set of one or more arbiter points that are representative of the set of un-clustered data points;

computing a per-arbiter similarity for each pair of data points in the set of un-clustered data points, based at least in part on the distances between data points in the pair with respect to each arbiter point in the set of arbiter points, such that the similarity metric indicates that data points ($x_1$) and ($x_2$) in a given data point pair are similar with respect to a given arbiter point (a) when a distance between ($x_1$) and ($x_2$) is less than: i) a distance between ($x_1$) and (a) and ii) a distance between ($x_2$) and (a);

combining the per-arbiter similarities for each data point pair to compute a similarity metric for each data point pair;

identifying data points ($x_1$) and ($x_2$) as similar data points when the similarity metric for ($x_1$) and ($x_2$) exceeds a threshold; and grouping the similar data points into the one or more clusters.

27. The computer-implemented method of claim 26, wherein ($x_1$), ($x_2$), and (a) include one or more numerical attribute values, and the method further comprising determining the similarity between ($x_1$) and ($x_2$) based, at least in part, on Euclidean distances between the numerical attributes of ($x_1$) and ($x_2$) and (a).

28. The computer-implemented method of claim 26, further comprising determining the similarity between ($x_1$) and ($x_2$) and (a) using a set of if-then rules that specify a similarity value based on given values of ($x_1$) and ($x_2$) and (a).

29. The computer-implemented method of claim 26, wherein ($x_1$), ($x_2$), and (a) include one or more binary attribute values, and the method further comprising determining the similarity between the binary attributes of ($x_1$) and ($x_2$) and (a) as:

i) 1 if a Hamming distance between ($x_1$) and ($x_2$) is less than both a Hamming distance between ($x_1$) and (a) and a Hamming distance between ($x_2$) and (a);

ii) −1 if the Hamming distance between ($x_1$) and ($x_2$) is greater than either the Hamming distance between ($x_1$) and (a) or the Hamming distance between ($x_2$) and (a); and iii) 0 if the Hamming distance between ($x_1$) and ($x_2$) is equal to both the Hamming distance between ($x_1$) and (a) and the Hamming distance between ($x_2$) and (a).

30. The computer-implemented method of claim 26, wherein data points in the data set each comprise values for a plurality of attributes, and the method further comprising:

for each arbiter, computing the distance between data points ($x_1$) and ($x_2$), and a given arbiter (a) by combining selected per-attribute distances between the data points and (a);

computing a per-arbiter similarity for each arbiter based, at least in part, on the distance; and combining the per-arbiter similarities to compute the similarity metric.

31. The computer-implemented method of claim 26, wherein data points in the data set each comprise values for a plurality of attributes, and the method further comprising:

for each arbiter point (a) in the set of arbiter points, determining a set of per-attribute distances between selected attributes of the data points ($x_1$), ($x_2$), and (a), where each set of per-attribute distances includes distances on the same attribute between data points ($x_1$), ($x_2$) and the arbiter points; and for respective sets of per-attribute distances, computing respective per-attribute similarities based, at least in part, on the set of per-attribute distances; and combining the per-attribute similarities to compute the similarity metric.

32. The computer-implemented method of claim 31, further comprising determining the similarity metric based on a proportion of per-attribute similarities that indicate that ($x_1$) and ($x_2$) are similar.

33. The computer-implemented method of claim 31, further comprising: i) determining a first per-attribute similarity based, at least in part, on a first subset of arbiters in A and ii) determining a second per-attribute similarity based on a second subset of arbiters in A that is different than the first subset.

34. The computer-implemented method of claim 33, further comprising i) determining the first per-attribute similarity based, at least in part, on an average of the first per-attribute distances and ii) determining the second per-attribute similarity based, at least in part, on an average of the second per-attribute distances.

35. The computer-implemented method of claim 34, further comprising adding a data point to two or more clusters for which the data point is similar to a threshold number of the member data points in the cluster.

36. The computer-implemented method of claim 33, further comprising instructions combining the first per-attribute similarity with the second per-attribute similarity according to a weighting scheme.

37. The computer-implemented method of claim 33, further comprising removing a member data point from a cluster when the member data point is not similar to an arbiter aggregation selected from: a majority of arbiters, a minority of arbiters, an average of arbiters, a weighted average of arbiters, and a threshold number of arbiters.

38. The computer-implemented method of claim 26, wherein data points in the data set each comprise values for a plurality of attributes, and the method further comprising identifying attributes as redundant attributes that do not significantly contribute to similarity analysis for $(x_1)$ and $(x_2)$ by:

selecting a subset of attributes;

computing a second similarity metric for $(x_1)$ and $(x_2)$ by combining the similarity metrics for attributes that are not members of the subset;

comparing the similarity metric with the second similarity metric; and when a difference between the similarity metric and the second similarity metric is below a threshold, identifying attributes in the subset of attributes as redundant attributes.

39. The computer-implemented method of claim 26, further comprising determining the threshold based, at least in part, on probability that a random pair of data points will be identified as similar by an aggregation of arbiter points.

40. The computer-implemented method of claim 26, further comprising creating the one or more clusters by:

selecting a first data point and a second data point for membership in a cluster, wherein the first data point and the second data point are identified as similar;

adding, as members of the cluster, data points that are similar to any member of the cluster; and until all data points are members of clusters:
  selecting a remaining data point that is not a member of a cluster to form a new cluster;
  adding data points that are similar to the remaining data point as members to the new cluster.

41. The computer-implemented method of claim 26, where the arbiter points are not members of the data set.

* * * * *

UNITED STATES PATENT AND TRADEMARK OFFICE
CERTIFICATE OF CORRECTION

PATENT NO. : 9,514,213 B2
APPLICATION NO. : 13/833757
DATED : December 6, 2016
INVENTOR(S) : Wood et al.

Page 1 of 1

It is certified that error appears in the above-identified patent and that said Letters Patent is hereby corrected as shown below:

On page 2, Column 1, under Other Publications, Line 13, delete "Hensinki" and insert -- Helsinki --, therefor.

In Column 3, Line 61, delete "$(a_2-a_n)$." and insert -- $(a_2-a_m)$. --, therefor.

In Column 15, Line 22, delete "0,5." and insert -- 0.5. --, therefor.

In Column 23, Line 1, in Claim 5, delete "$(x_i)$" and insert -- $(x_1)$ --, therefor.

In Column 24, Line 52, in Claim 20, after "processor" delete "to".

Signed and Sealed this
Twentieth Day of June, 2017

Joseph Matal
*Performing the Functions and Duties of the*
*Under Secretary of Commerce for Intellectual Property and*
*Director of the United States Patent and Trademark Office*